US010935108B2

(12) United States Patent
Kittaka et al.

(10) Patent No.: US 10,935,108 B2
(45) Date of Patent: Mar. 2, 2021

(54) TRANSMISSION APPARATUS FOR SADDLE-TYPE VEHICLE

(71) Applicant: HONDA MOTOR CO., LTD., Tokyo (JP)

(72) Inventors: Eiji Kittaka, Wako (JP); Takashi Kudo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 686 days.

(21) Appl. No.: 15/714,027

(22) Filed: Sep. 25, 2017

(65) Prior Publication Data

US 2018/0087603 A1 Mar. 29, 2018

(30) Foreign Application Priority Data

Sep. 29, 2016 (JP) .............................. JP2016-192076

(51) Int. Cl.
| *F16H 3/089* | (2006.01) |
| *F16H 57/00* | (2012.01) |
| *B60K 17/344* | (2006.01) |
| *F16H 57/02* | (2012.01) |

(52) U.S. Cl.
CPC ........... *F16H 3/089* (2013.01); *B60K 17/344* (2013.01); *F16H 57/0006* (2013.01); *B60Y 2200/12* (2013.01); *F16H 2057/0203* (2013.01); *F16H 2057/02065* (2013.01); *F16H 2200/0017* (2013.01); *F16H 2200/0043* (2013.01)

(58) Field of Classification Search
CPC ................. F16H 3/089; F16H 57/0006; F16H 2200/0043; F16H 2057/0203; F16H 2057/02065; F16H 2200/0017; B60K 17/344; B60Y 2200/12; B62M 11/06
See application file for complete search history.

(56) References Cited

U.S. PATENT DOCUMENTS

2002/0148309 A1* 10/2002 Rioux ................. F16H 61/0437
74/335
2007/0272196 A1  11/2007 Nishi et al.
2014/0251082 A1*  9/2014 Beasock .............. B60K 17/344
74/665 F

FOREIGN PATENT DOCUMENTS

| EP | 2515008 A1 | 10/2012 |
| JP | 2007-315518 A | 12/2007 |
| JP | 2008-180255 A | 8/2008 |
| JP | 2012-225437 A | 11/2012 |
| JP | 2013-166163 A | 8/2013 |

(Continued)

OTHER PUBLICATIONS

Chinese Office Action (English translation) dated Apr. 2, 2019, 6 pages.
Japanese Office Action dated Feb. 12, 2019, 4 pages.

*Primary Examiner* — Victor L MacArthur
(74) *Attorney, Agent, or Firm* — Rankin, Hill & Clark LLP

(57) ABSTRACT

In a transmission apparatus for a saddle-type vehicle, dowels on first transmission gears are engageable in and disengageable from dowel holes in adjacent second transmission gears to shift gear positions. The first transmission gears are slidable in response to angular movement of a shift spindle caused by operating a shift pedal. Invalid engagement time, during which the dowels and dowel columns are in sliding abutment, at an idling engine rotational speed is in the range from 0 msec. to 40 msec., providing an enhanced feeling for gear shifting operations and reduce hammering noise.

9 Claims, 27 Drawing Sheets

(56) References Cited

FOREIGN PATENT DOCUMENTS

JP 5487065 2/2014
JP 2014-077539 A 5/2014

* cited by examiner

TRANSMISSION APPARATUS FOR SADDLE-TYPE VEHICLE

TECHNICAL FIELD

The present invention relates to a transmission apparatus for a saddle-type vehicle.

BACKGROUND ART

Some constant-mesh multi-range gear transmissions on saddle-type vehicles include transmission gears with dog clutches, and the number of dowels and the sizes of dowels and dowel holes of those dog clutches are specified for the purpose of preventing hammering noise from being produced by the dowels as they hit mating components. If the transmission gears are manually shifted, then not only the hammering noise needs to be prevented, but also required mechanical strength of the dowels has to be achieved and the user's feeling in shifting the transmission gears should be enhanced.

PRIOR ART DOCUMENT

Patent Document

[Patent Document 1]
Japanese Patent No. 5487065

SUMMARY OF THE INVENTION

Problems to be Solved by the Invention

The present invention has been made in order to overcome the above underlying problems. It is an object of the present invention to provide a transmission apparatus for a saddle-type vehicle which can reduce hammering noise caused by dowels as they hit mating components when transmission gears are shifted, achieve required mechanical strength of the dowels, and improve the user's feeling in shifting the transmission gears.

Means for Solving the Problems

According to the present invention, there is provided a transmission apparatus for a saddle-type vehicle, including: first transmission gears supported on support shafts so as to be circumferentially non-rotatable and axially slidable with respect to the support shafts; and second transmission gears supported on the support shafts adjacent to the first transmission gears so as to be circumferentially rotatable and axially non-slidable with respect to the support shafts; the first transmission gears having dowels projecting axially; the second transmission gears having dowel holes defined axially concavely therein and dowel columns defining the dowel holes; the dowels being engageable in and disengageable from the dowel holes to shift gear positions; the first transmission gears being slidable in response to angular movement of a shift spindle caused by operating a shift pedal; wherein an invalid engagement time during which facing wall surfaces of the dowels and facing wall surfaces of the dowel columns abut and slide against each other at an idling engine rotational speed is in the range from 0 msec. (millisecond) to 40 msec., the number of the dowels is in the range from 11 to 19, and the number of the dowel columns is in the range from 11 to 19.

With the above arrangement, the invalid engagement time during which the dowels and the dowel columns abut and slide against each other is reduced thereby to reduce hammering noise of the dowels, making gear shifting operations smooth to provide an enhanced feeling therefor. Both the dowels and the dowel columns are of a minimum size for dealing with torques that can be transmitted by the transmission apparatus, and the numbers of the dowels and the dowel columns are increased to achieve the required mechanical strength of the dowels and the dowel columns. The dowel backlash angle is reduced to reduce hammering noise produced when the dowels mesh with the dowel columns and also to reduce wobbling and backlash caused when the dowels mesh with the dowel columns.

In the above arrangement, the number of the dowels may be in the range from 11 to 19, and the number of the dowel columns may be in the range from 11 to 19.

With this arrangement, the number of dowels and the number of dowel columns are thus optimized to achieve the required mechanical strength of the dowels and the dowel columns. The dowel backlash angle is reduced to reduce hammering noise produced when the dowels mesh with the dowel columns and also to reduce wobbling and backlash caused when the dowels mesh with the dowel columns.

In the above arrangement, a dowel nipping angle between line segments extending from the center of rotation of the transmission gears through abutment points on both sides of the dowels where the dowels and the dowel columns abut against each other may be in the range from 6 degrees to 9 degrees, and a dowel column nipping angle between line segments extending from the center of rotation of the transmission gears through abutment points on both sides of the dowel columns where the dowel columns and the dowels abut against each other may be in the range from 6 degrees to 9 degrees.

With this arrangement, the dowel nipping angle and dowel column nipping angle that are in the range from 6 degrees to 9 degrees allow the numbers of dowels and the number of dowel columns to increase, so that the invalid engagement time can be shortened for making gear shifting operations smooth.

In the above arrangement, a backlash angle between the dowels and the dowel columns may be in the range from 0 degree to 15 degrees.

With this arrangement, as the backlash angle between the dowels and the dowel columns is a small angle from 0 degree to 15 degrees, it is possible to increase the number of dowels and reduce the invalid engagement time for an enhanced feeling for gear shifting operations.

In the above arrangement, the dowels may include inner circumferential stiffener rings and dowel back plates, and the dowel columns may include outer circumferential stiffener rings and dowel column back plates.

With this arrangement, the dowels include the inner circumferential stiffener rings and the dowel back plates, and the dowel columns include the outer circumferential stiffener rings and the dowel column back plates. Therefore, the mechanical strength of the dowels and the dowel columns is increased.

Abutment surfaces of the dowels for abutment against the dowel columns may be spread from line segments extending from the center of rotation of the transmission gears through abutment points between the dowels and the dowel columns, and abutment surfaces of the dowel columns for abutment against the dowels may be spread from line segments extending from the center of rotation of the transmission gears through abutment points between the dowels and the dowel columns.

With the above arrangement, the mechanical strength of the dowel base ends of the dowels and the dowel column base ends of the dowel columns is increased for an increase in the mechanical strength of the dowels and the mechanical strength of the dowel columns.

In the above arrangement, the length from the pitch circle of the dowels and the dowel columns to dowel tip ends of the dowels may be smaller than the length from the pitch circle of the dowels and the dowel columns to dowel base ends of the dowels, and the length from the pitch circle of the dowels and the dowel columns to dowel column tip ends of the dowel columns may be smaller than the length from the pitch circle of the dowels and the dowel columns to dowel column base ends of the dowel columns.

With this arrangement, the mechanical strength of the dowel base ends and the dowel column base ends is further increased to further increase the mechanical strength of the dowels and the dowel columns in their entirety.

In the above arrangement, of the abutment surfaces of the dowels and the dowel columns which abut against each other, the abutment surfaces of either the dowels or the dowel columns are straight whereas the abutment surfaces of the other are curved as viewed along the axis of rotation of the transmission gears.

With this arrangement, of the abutment surfaces of the dowels and the dowel columns which abut against each other, the abutment surfaces of either the dowels or the dowel columns are straight whereas the abutment surfaces of the other are curved. Therefore, variations of the radii of the abutment points between the dowels and the dowel columns from the center of rotation of the transmission gears are reduced, tending to uniformize stresses in the dowels and the dowel columns.

Inflection points on the dowel columns between curved surfaces of dowel column base ends of the dowel columns and abutment surfaces thereof may be positioned radially outwardly of inflection points on the dowels between curved surfaces of dowel tip ends of the dowels and abutment surfaces thereof, and inflection points on the dowels between curved surfaces of dowel base ends of the dowels and abutment surfaces thereof may be positioned radially inwardly of inflection points on the dowel columns between curved surfaces of dowel column tip ends of the dowel columns and abutment surfaces thereof.

With this arrangement, the dowels and the dowel columns can be brought closer to each other, making it possible to increase the numbers of the dowels and the dowel columns.

Advantageous Effects of the Invention

According to the present invention, the numbers of the dowels and the dowel columns are increased to achieve the required mechanical strength of the dowels and the dowel columns. The invalid engagement time is reduced thereby to reduce hammering noise of the dowels, making gear shifting operations smooth to provide an enhanced feeling therefor. Both the dowels and the dowel columns are of a minimum size for dealing with torques that can be transmitted by the transmission apparatus, and the numbers of the dowels and the dowel columns are increased to reduce the dowel backlash angle to reduce hammering noise produced when the dowels mesh with the dowel columns and also to reduce wobbling and backlash caused when the dowels mesh with the dowel columns.

MODE FOR CARRYING OUT THE INVENTION

A transmission apparatus 30 for a saddle-type vehicle according to an embodiment of the present invention will be described below with reference to the drawings. The transmission apparatus 30 according to the present embodiment will be described as Inventive Example 1.

The transmission apparatus 30 for a saddle-type vehicle according to the present embodiment is applied to a constant-mesh multi-range gear transmission placed in the drive train for transmitting power from an internal combustion engine E on a motorcycle, not depicted, to a drive wheel thereof.

The internal combustion engine E includes an inline two-cylinder four-stroke internal combustion engine having two cylinders arranged in a series. The internal combustion engine E is transversely mounted on the motorcycle with its crankshaft 10 oriented laterally. In the description that follows, the direction in which the motorcycle moves forward is referred to as a forward direction, the direction opposite the forward direction as a rearward direction, the left-hand direction when looking in the forward direction as a leftward direction, and the right-hand direction when looking in the forward direction as a rightward direction.

Figure 1:
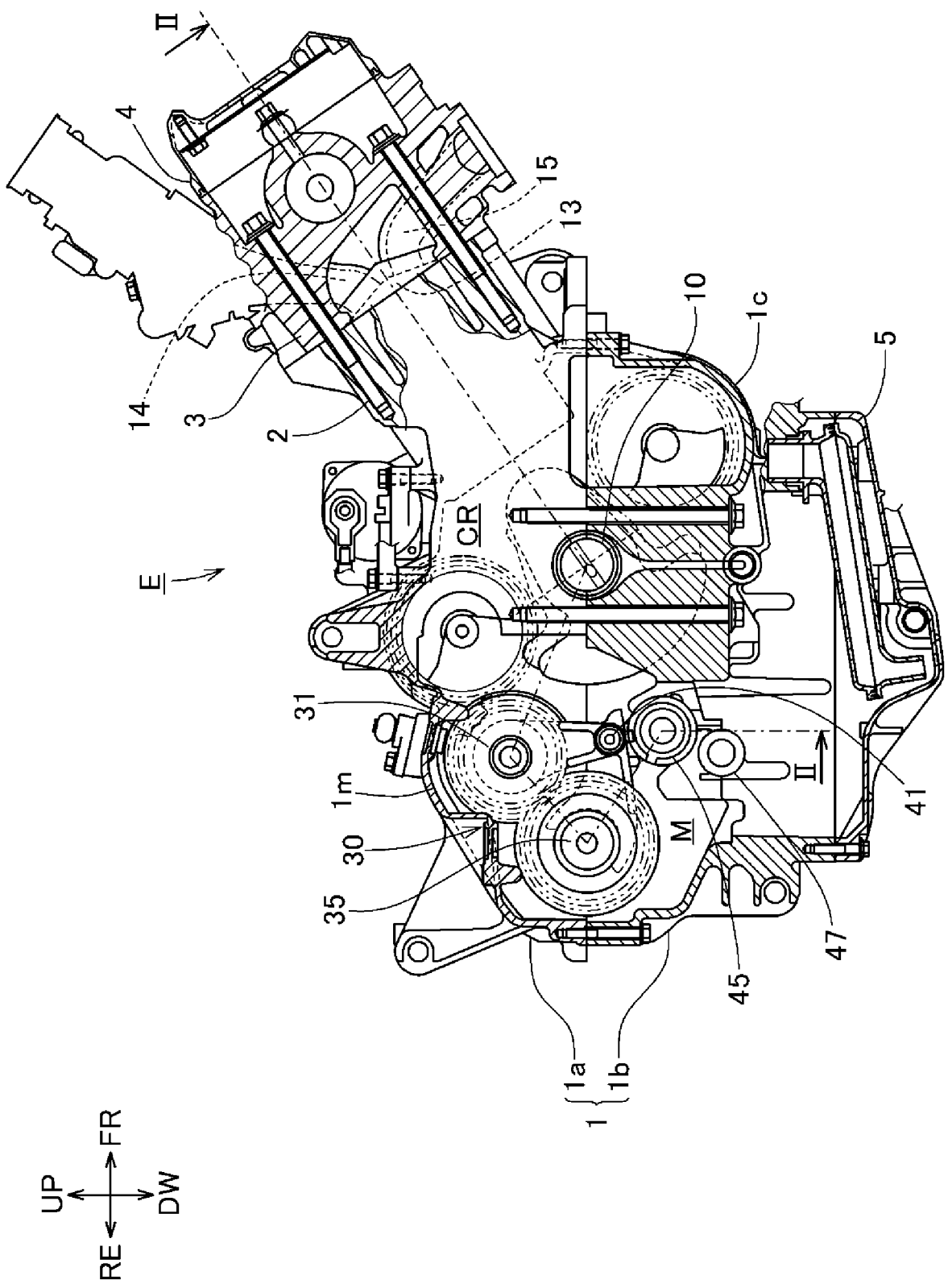
FIG. 1 is a vertical cross-sectional view of an internal combustion engine incorporating a transmission apparatus for a saddle-type vehicle according to an embodiment of the present invention.
Figure 2:
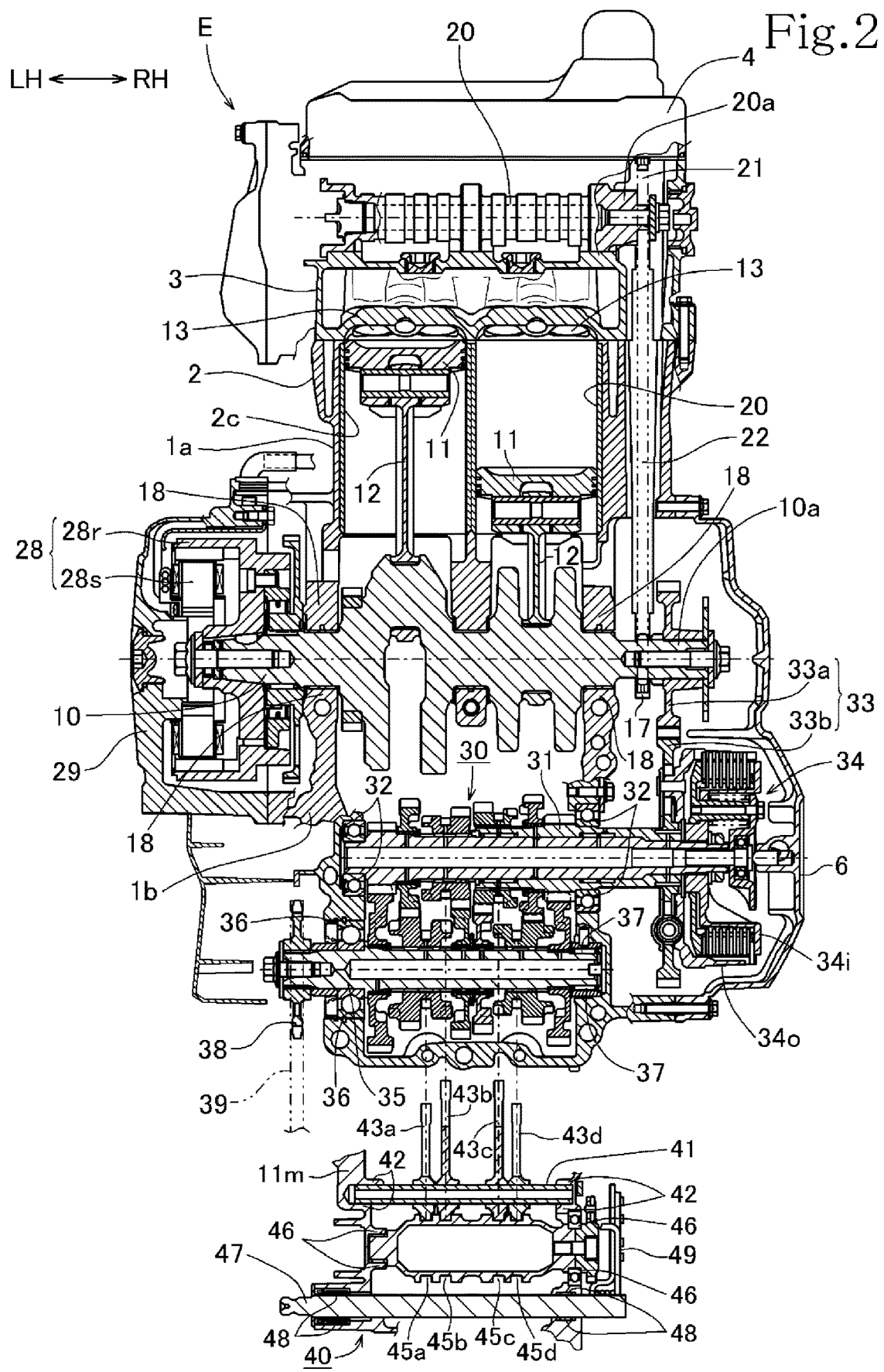
FIG. 2 is a cross-sectional view taken along line II-II of FIG. 1.

FIG. 1 is a vertical cross-sectional view of the internal combustion engine E, and FIG. 2 is a developed cross-sectional view of the internal combustion engine E. As depicted in FIG. 1, the internal combustion engine E has a unit case 1 including a crankcase 1c that defines therein a crank chamber CR housing the crankshaft 10 and a transmission case 1m that defines therein a transmission chamber M housing the transmission apparatus 30, the crankcase 1c and the transmission case 1m being integrally formed in the forward and rearward directions. The unit case 1 itself is of a vertically split structure including an upper unit case 1a and a lower unit case 1b, dividing the transmission case 1m into upper and lower transmission cases 11m.

An integrally formed cylinder block 2 having two cylinder bores 2c depicted in FIG. 2 that are arrayed in line extends upwardly from an upper portion of the upper unit case 1a and is slightly inclined forwardly, as depicted in FIG. 1. A cylinder head 3 is mounted on the cylinder block 2 and covered with a cylinder cover 4. An oil pan 5 is attached to a lower portion of the unit case 1.

As depicted in FIG. 2, pistons 11 are reciprocally slidably fitted in the respective two cylinder bores 2c in the cylinder block 2. The pistons 11 are coupled to the crankshaft 10 by respective connecting rods 12.

The cylinder head 3 has combustion chambers 13 defined therein in facing relation to the respective pistons 11 in the cylinder bores 2c, intake ports 14 extending rearwardly that are open into the combustion chambers 13 and can be selectively opened and closed by a pair of intake valves, not depicted, and exhaust ports 15 extending forwardly that can be selectively opened and closed by a pair of exhaust valves, not depicted. Spark plugs, not depicted, exposed to the combustion chambers 13 are mounted.

The intake valves and the exhaust valves are actuated by a camshaft 20 rotatably supported in the cylinder head 3 in synchronism with rotation of the camshaft 20. As depicted in FIG. 2, a cam sprocket 21 is fitted over a right end 20a of the camshaft 20, and a drive sprocket 17 is fitted over the crankshaft 10 near a right end portion 10a thereof. A timing chain 22 is trained around the cam sprocket 21 and the drive sprocket 17 for transmitting power from the crankshaft 10 to the camshaft 20 to rotate the camshaft 20 about its own axis at a rotational speed that is one half of the rotational speed of the crankshaft 10.

The crankshaft 10 is rotatably supported by main bearings 18 interposed between the upper unit case 1a and the lower unit case 1b. The crankshaft 10 has a left end portion extending through a left side wall of the crankcase 1c. An alternator 28 includes an outer rotor 28r fitted over the left end portion of the crankshaft 10 and an inner stator 28s housed in the outer rotor 28r and supported by an alternator cover 29 that is placed over a left portion of the alternator 28, the inner stator 28s having generating coils of the alternator 28.

As shown in FIG. 1, the transmission chamber M is defined in the transmission case 1m behind the crank chamber CR of the crankcase 1c that houses the crankshaft 10 therein.

The transmission apparatus 30 housed in the transmission chamber M includes a constant-mesh selective-slide gear transmission. The transmission apparatus 30 includes a main shaft 31 rotatably supported on left and right bearing portions of the upper transmission case 11m by a pair of ball bearings 32 rearwardly and obliquely upwardly of the crankcase shaft 10 (see, FIG. 2), and a countershaft 35 rotatably supported on and sandwiched between semiarcuate bearing portions on the mating surfaces of the upper and lower transmission cases 11m by a ball bearing 36 and needle bearings 37, at a rear position of the crankcase shaft 10 (see, FIG. 2).

As depicted in FIG. 2, the main shaft 31 has a right end portion projecting from the transmission chamber M with a multi-plate friction clutch 34 mounted thereon which includes a large-diameter clutch outer 34o and a small-diameter clutch inner 34i. A primary speed reducer mechanism 33 includes a primary driven gear 33b co-rotatably supported on the clutch outer 34o and a primary drive gear 33a co-rotatably supported on the right end portion 10a of the crankshaft 10 that extends through a right side wall of the crankcase 1c, the primary driven gear 33b and the primary drive gear 33a being held in mesh with each other.

The clutch inner 34i, which serves as an output component of the friction clutch 34, is spline-fitted to the main shaft 31. Therefore, the rotation of the crankshaft 10 is transmitted through the primary speed reducer mechanism 33 and the friction clutch 34 to the main shaft 31. The friction clutch 34 on the right end portion of the main shaft 31 is covered with a right case cover 6 placed thereover at a position on the right side of the friction clutch 34.

The rotation of the main shaft 31 is transmitted to the countershaft 35 through an intermeshing engagement between transmission gears m1 through m6 on the drive side of the transmission apparatus 30 and transmission gears n1 through n6 on the driven side thereof. The countershaft 35, which serves as an output shaft of the transmission apparatus 30, has a left end portion projecting out through a left side wall of the unit case 1. An output sprocket 38 is fitted over the projecting left end portion of the countershaft 35. A power transmitting chain 39 is trained around the output sprocket 38 and a driven sprocket on the rear wheel of the motorcycle, not shown. The output sprocket 38, the power transmitting chain 39, and the driven sprocket jointly make up a secondary speed reducer mechanism that transmits the power from the transmission apparatus 30 to the rear wheel.

Figure 3:
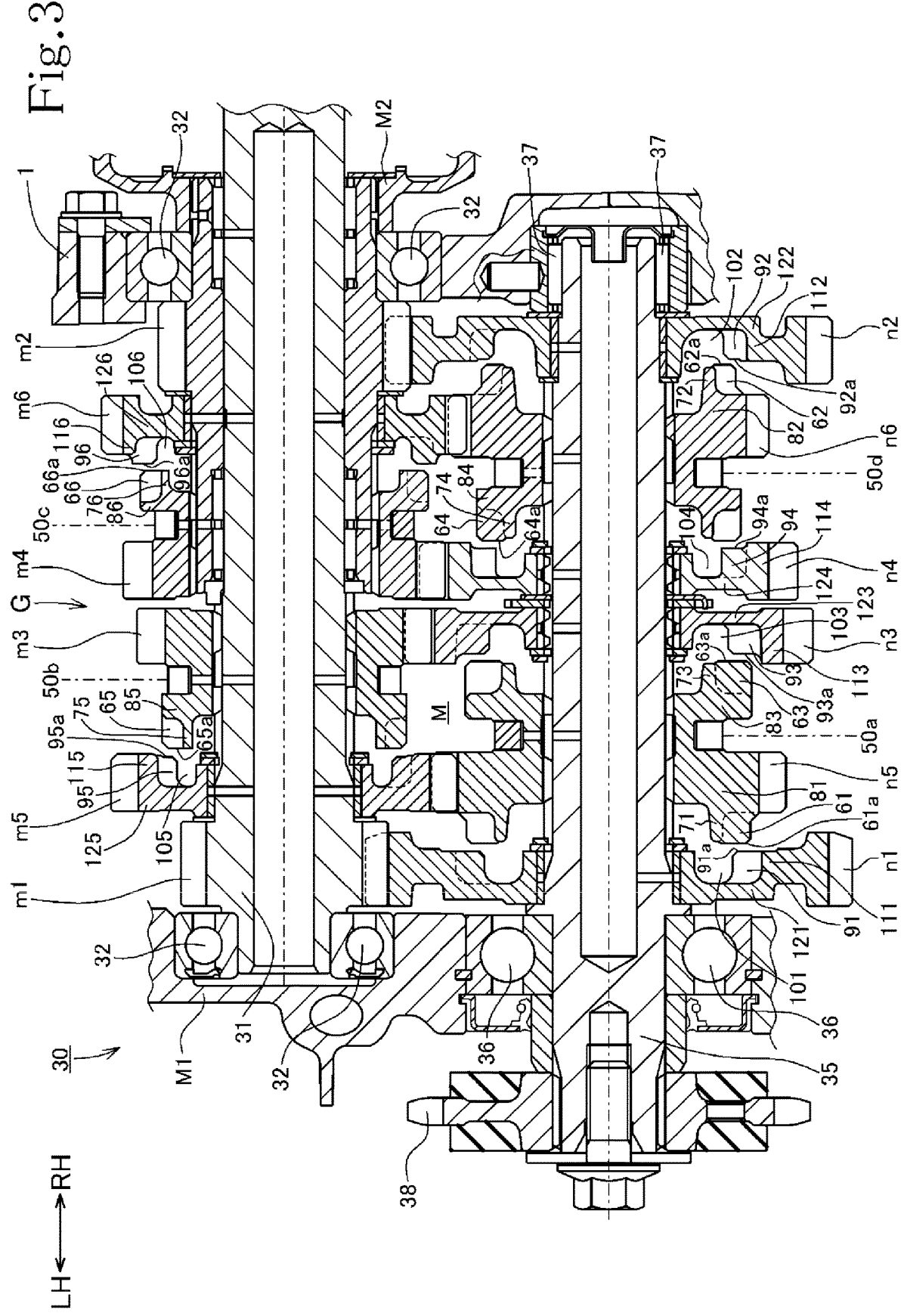
FIG. 3 is an enlarged fragmentary cross-sectional view of the transmission apparatus depicted in FIG. 2.

As depicted in FIG. 3, the transmission apparatus 30 has a transmission gear train G disposed in the transmission chamber M. The transmission gear train G includes the six drive transmission gears m1 through m6 and the six driven transmission gears n1 through n6. The drive transmission gears m1 through m6 which provide gear ratios for first through six gear positions are supported on the main shaft 31 of the transmission apparatus 30. Of these drive transmission gears m1 through m6, the transmission gears m1 and m2 are integrally formed with the main shaft 31, the transmission gears m3 and m4 are spline-fitted to the main shaft 31 so that they are axially slidable but circumferentially non-rotatable on the main shaft 31, and the transmission gears m5 and m6 are mounted on the main shaft 31 so that they are axially non-slidable but circumferentially non-rotatable on the main shaft 31.

The driven transmission gears n1 through n6 are supported on the countershaft 35 in mesh with the drive transmission gears m1 through m6, respectively. Of these driven transmission gears n1 through n6, the driven transmission gears n1, n2, n3, and n4 are mounted on the countershaft 35 so that they are axially non-slidable but circumferentially rotatable on the countershaft 35, and the driven transmission gears n5 and n6 are spline-fitted to the countershaft 35 so that they are axially slidable but circumferentially non-rotatable on the countershaft 35.

The intermeshing transmission gears m1 and n1 which provide the largest gear ratio are disposed in a leftmost position along a left side wall M1 of the transmission chamber M. The intermeshing transmission gears m2 and n2 are disposed in a rightmost position along a right side wall M2 of the transmission chamber M. The intermeshing transmission gears m5 and n5, the intermeshing transmission gears m3 and n3, the intermeshing transmission gears m4 and n4, and the intermeshing transmission gears m6 and n6 are disposed successively from the left to the right between the intermeshing transmission gears m1 and n1 and the intermeshing transmission gears m2 and n2. The drive transmission gears m3 and m4 that are axially slidable and the driven transmission gears n5 and n6 that are axially slidable have grooves 50a, 50b, 50c, and 50d defined therein for engagement with shift forks 43a, 43b, 43c, and 43d of a transmission gear shifting mechanism 40 to be described later. The drive transmission gears m3 and m4 and the driven transmission gears n5 and n6 are axially moved when the transmission gear shifting mechanism 40 is actuated.

The transmission gears m5 and m3 are disposed adjacent to each other on the main shaft 31. The transmission gears m4 and m6 are disposed adjacent to each other on the main shaft 31. The transmission gears m3 and m4 have dowels 65 and 66 projecting axially from side surfaces thereof, and the transmission gears m5 and m6 have dowel columns 95 and 96 disposed on side surfaces thereof for abutting engagement with the dowels 65 and 66, respectively, and dowel holes 105 and 106 defined axially concavely in the side surfaces thereof by the dowel columns 95 and 96 for receiving the dowels 65 and 66, respectively.

When the transmission gear m3 is moved axially to the left, the dowels 65 engage in the dowel holes 105 as facing wall surfaces 65a of the dowels 65 abut and slide against facing wall surfaces 95a of the dowel columns 95. When the transmission gear m4 is moved axially to the right, the dowels 66 engage in the dowel holes 105 as facing wall surfaces 66a of the dowels 66 abut and slide against facing wall surfaces 96a of the dowel columns 96.

The transmission gears n1 and n5 are disposed adjacent to each other on the countershaft 35. The transmission gears n5 and n3 are disposed adjacent to each other on the countershaft 35. The transmission gears n4 and n6 are disposed adjacent to each other on the countershaft 35. The transmission gears n6 and n2 are disposed adjacent to each other on the countershaft 35. The transmission gears n5 and n6 have dowels 61, 62, 63, and 64 projecting from side surfaces thereof, and the transmission gears n1, n3, n4, and n2 have dowel columns 91, 92, 93, and 94 disposed on side surfaces thereof for abutting engagement with the dowels 61, 62, 63, and 64, respectively, and dowel holes 101, 102, 103, and 104 defined axially concavely in the side surfaces thereof by the dowel columns 91, 92, 93, and 94 for receiving the dowels 61, 62, 63, and 64, respectively.

When the transmission gear n5 is moved axially to the left, the dowels 61 engage in the dowel holes 101 as facing wall surfaces 61a of the dowels 61 abut and slide against facing wall surfaces 91a of the dowel columns 91. When the transmission gear n5 is moved axially to the right, the dowels 63 engage in the dowel holes 103 as facing wall surfaces 63a of the dowels 63 abut and slide against facing wall surfaces 93a of the dowel columns 93. When the transmission gear n6 is moved axially to the left, the dowels 64 engage in the dowel holes 104 as facing wall surfaces 64a of the dowels 64 abut and slide against facing wall surfaces 94a of the dowel columns 94. When the transmission gear n6 is moved axially to the right, the dowels 62 engage in the dowel holes 102 as facing wall surfaces 62a of the dowels 62 abut and slide against facing wall surfaces 92a of the dowel columns 92.

As depicted in FIGS. 1 and 2, the transmission gear shifting mechanism 40 for shifting gears of the transmission apparatus 30 includes a shift fork shaft 41 having opposite ends fitted in and supported by left and right bearing portions 42 of the upper transmission case 11m rearwardly of the main shaft 31. The transmission gear shifting mechanism 40 also includes a shift drum 45 rotatably supported on left and right bearing portions of the upper transmission case 11m by bearings 46 downwardly of the shift fork shaft 41.

A shift spindle 47 is rotatably supported on left and right bearing portions of the upper transmission case 11m by bearings 48 forwardly and slightly obliquely downwardly of the shift drum 45.

The shift drum 45 has four shift grooves 45a, 45b, 45c, and 45d defined in an outer circumferential surface thereof at axially spaced intervals, and a first shift fork 43a, a second shift fork 43b, a third shift fork 43c, and a fourth shift fork 43d are axially slidably supported on the shift fork shaft 41 and have respective shift pins engaging in the shift grooves 45a, 45b, 45c, and 45d.

The shift drum 45 is turned about its own axis when an angular movement of the shift spindle 47 through a given angle is transmitted to the shift drum 45 by a link mechanism 49. A shift pedal, not shown, is operatively coupled to the shift spindle 47 through a ratchet mechanism, not shown. When the rider of the motorcycle operates the shift pedal (not depicted) the shift spindle 47 is turned about its own axis through a given angle in a desired direction, turning the shift drum 45 about its own axis through a corresponding angle.

When the shift drum 45 is thus turned by the shift pedal operated by the rider, the second shift fork 43b and the third shift fork 43c are axially moved by being guided by the second shift groove 45b and the third shift groove 45c, axially moving the transmission gear m3 and the transmission gear m4 on the main shaft 31, and the first shift fork 43a and the fourth shift fork 43d are axially moved by being guided by the first shift groove 45a and the fourth shift groove 45d, axially moving the transmission gear n5 and the transmission gear n6 on the countershaft 35. In this manner, the dowels and the dowel holes of desired transmission gears are brought into and out of engagement, selecting a set of transmission gears to shift the transmission apparatus 30 into a desired gear position for effectively transmitting power from the crankshaft 10 to the rear wheel.

The shapes of the drive transmission gears m3 through m6 and the driven transmission gears n1 through n6 of the transmission apparatus 30 and engaged states of the transmission gears m3 through m6, and n1 through n6 in the respective gear positions are illustrated in FIGS. 4 through 24, and various conditions for the transmission gears are depicted in Table 1 below.

Figure 4:
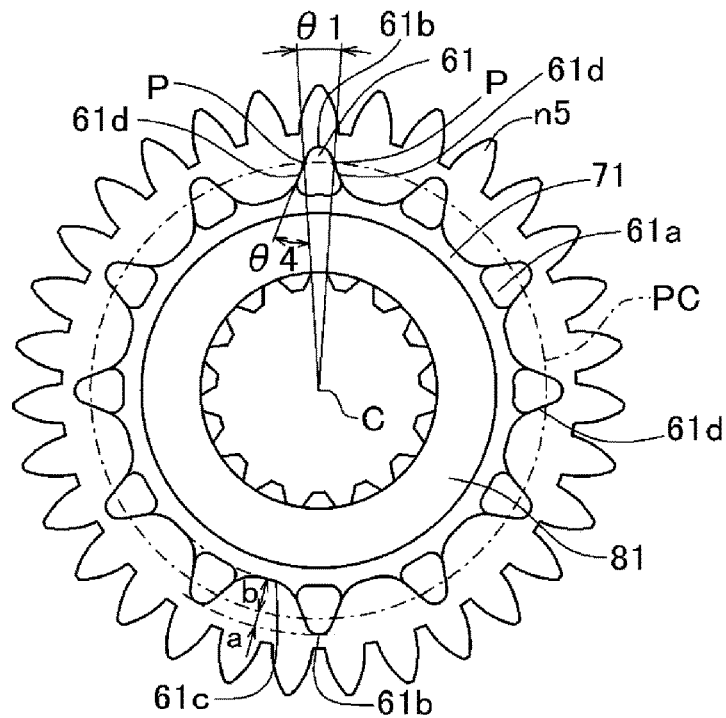
FIG. 4 is a left-hand side elevational view of a transmission gear n5.
Figure 5:
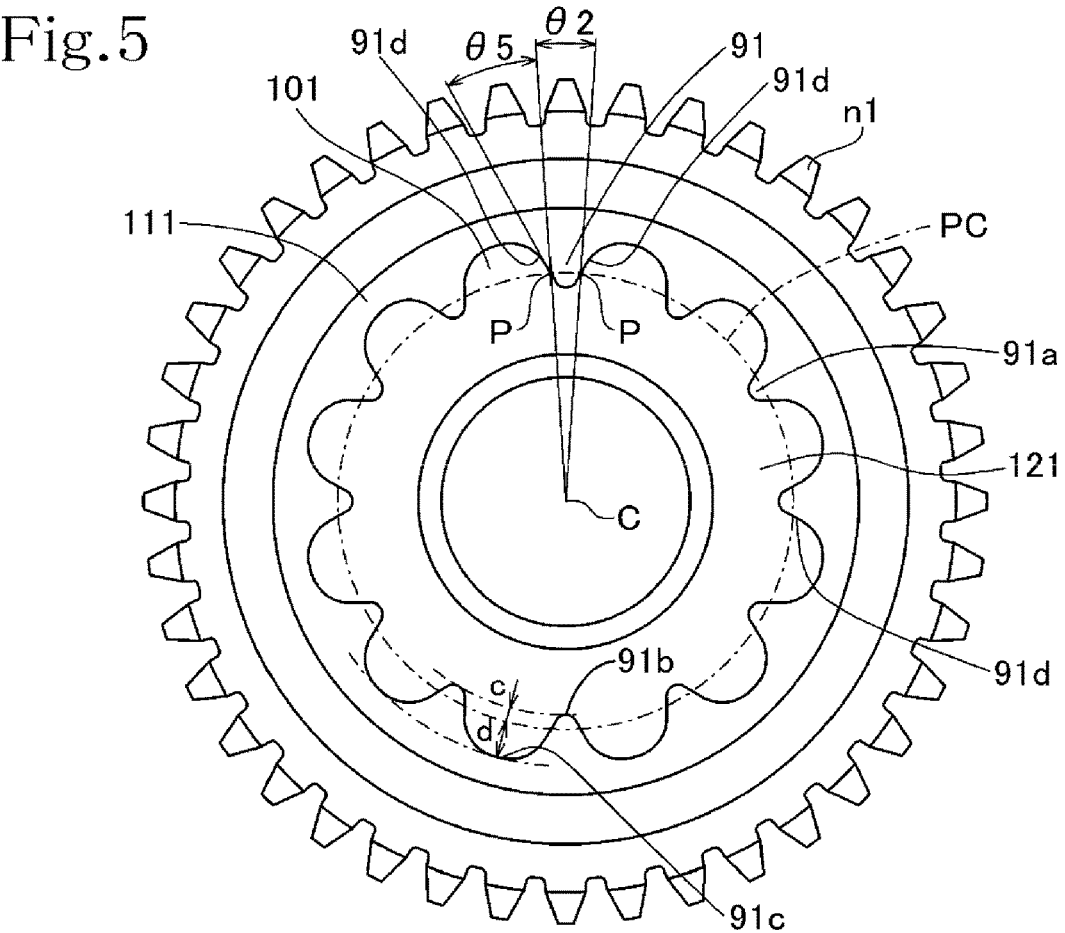
FIG. 5 is a right-hand side elevational view of a transmission gear n1.
Figure 6:
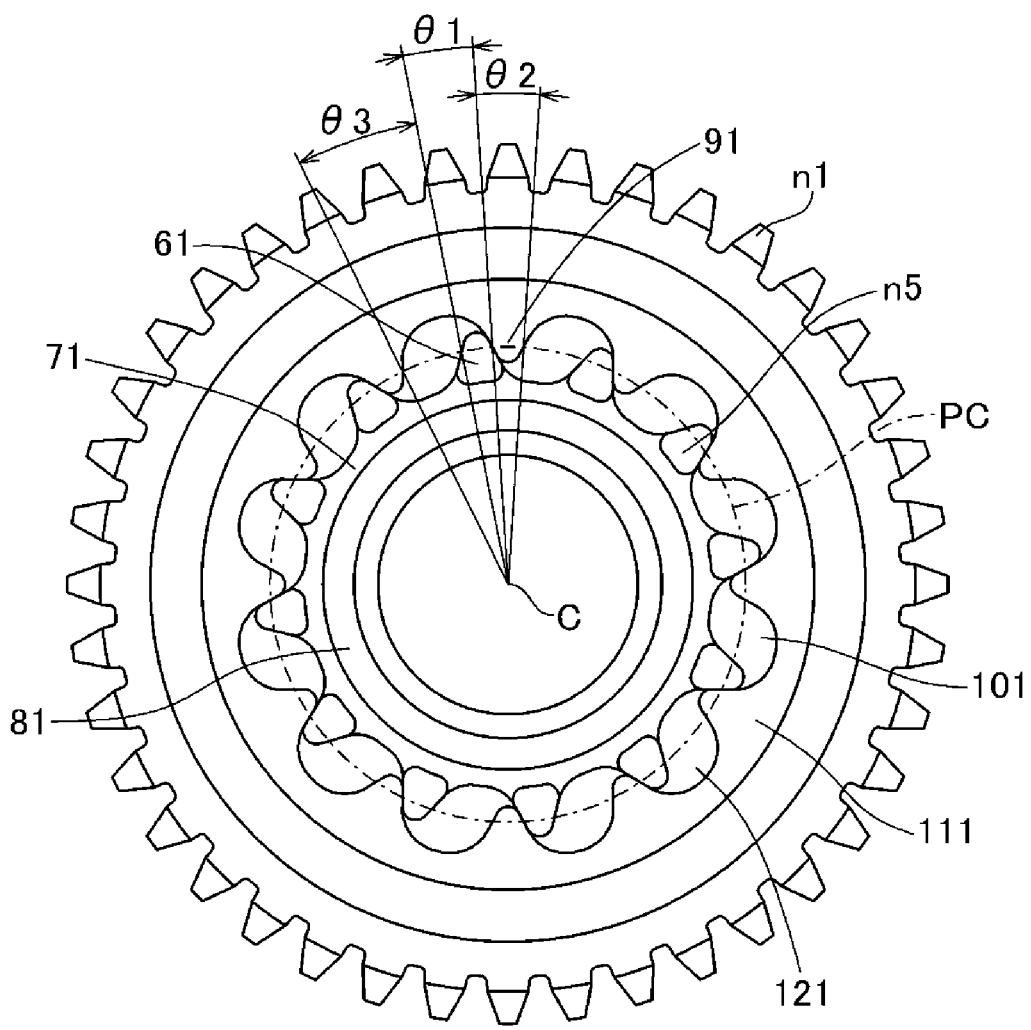
FIG. 6 is a side elevational view depicting an engaged state of the transmission gear n5 and the transmission gear n1 in a first gear position.

The driven transmission gears n1 and n5 that engage each other in the first gear position will be described in detail below as an example of gears of the transmission apparatus 30 with reference to FIGS. 3 through 6. FIG. 4 is a left-hand side elevational view of the transmission gear n5, FIG. 5 is a right-hand side elevational view of the transmission gear n1, and FIG. 6 is a side elevational view depicting an engaged state of the transmission gear n5 and the transmission gear n1 in the first gear position. As depicted in FIG. 3, the transmission gears n1 and n5 are disposed adjacent to each other on the countershaft 35. When the rider operates the shift pedal to select the first gear position, the first shift fork 43a of the transmission gear shifting mechanism 40 is moved to the left, moving the transmission gear n5 to the left thereby to bring the transmission gears n1 and n5 into engagement with each other.

As depicted in FIGS. 3 and 4, the transmission gear n5 has on its left side surface twelve angularly spaced dowels 61 axially projecting therefrom along the countershaft 35. The dowels 61 have respective surfaces lying perpendicularly to the countershaft 35 as the facing wall surfaces 61a that face the dowel columns 91.

Each of the dowels 61 has two abutment points P on its both sides where the dowel 61 and adjacent dowel columns 91 abut against each other, and the angle between two line segments extending from the center C of rotation of the transmission gear n5 through the abutment points P will be referred to as dowel nipping angle $\theta 1$. On the transmission gear n5 according to the present embodiment, dowel nipping angle $\theta 1$ is set to 7.4 degrees.

The dowel 61 has abutment surfaces 61d respectively on its both sides for abutment against the dowel columns 91. The abutment surfaces 61d are spread or angularly spaced from the line segments extending from the center C of rotation of the transmission gear n5 through the abutment points P by an angle referred to as dowel spreading angle $\theta 4$. On the transmission gear n5 according to the present embodiment, dowel spreading angle $\theta 4$ is set to 25 degrees.

As depicted in FIGS. 3 and 5, the transmission gear n1 has on its right side surface twelve angularly spaced dowel columns 91 projecting axially therefrom along the countershaft 35. The dowel columns 91 have respective surfaces lying perpendicularly to the countershaft 35 as the facing wall surfaces 91a that face the dowels 61 of the transmission shaft n5. The dowel columns 91 define therebetween twelve angularly spaced dowel holes 101 in which the dowels 61 of the transmission gear n5 can engage.

As depicted in FIG. 5, each of the dowel columns 91 has two abutment points P on its both sides where the dowel column 91 and adjacent dowels 61 abut against each other, and the angle between two line segments extending from the center C of rotation of the transmission gear 15 through the abutment points P will be referred to as dowel column nipping angle $\theta 2$. On the transmission gear n1 according to the present embodiment, dowel column nipping angle $\theta 2$ is set to 7.4 degrees.

The dowel column 91 has abutment surfaces 91d on its both sides for abutment against the dowels 61. The abutment surfaces 91d are spread or angularly spaced from the line segments extending from the center C of rotation of the transmission gear n1 through the abutment points P by an angle referred to as dowel column spreading angle $\theta 5$. On the transmission gear n1 according to the present embodiment, dowel column spreading angle $\theta 5$ is set to 25 degrees.

As depicted in FIG. 6, when the dowels 61 engage in the respective dowel holes 101, the dowels 61 can move in the dowel holes 101 through backlash angle $\theta 3$. According to the present embodiment, backlash angle $\theta 3$ is set to 14.8 degrees.

As depicted in FIG. 4, each of the dowels 61 on the left side surface of the transmission gear n5 has a length "a" from a pitch circle PC of the dowels 61 and the dowel columns 91 to a dowel tip end 61b, and a length "b" from the pitch circle PC to a dowel base end 61c, the length "a" being smaller than the length "b," e.g., the relationship a<b is satisfied. As depicted in FIG. 5, each of the dowel columns 91 on the right side surface of the transmission gear n1 has a length "c" from the pitch circle PC to a dowel column tip end 91b, and a length "d" from the pitch circle PC to a dowel column base end 91c, the length "c" being smaller than the length "d," e.g., the relationship c<d is satisfied.

As depicted in FIGS. 6 through 9, one of the abutment surfaces 61d and 91d of the dowels 61 and the dowel columns 91 is curved whereas the other is straight as viewed along the axis of rotation of the transmission gears. According to the present embodiment, the abutment surfaces 61d of the dowels 61 are curved, whereas the abutment surfaces 91d of the dowel columns 91 are straight.

Figure 7:
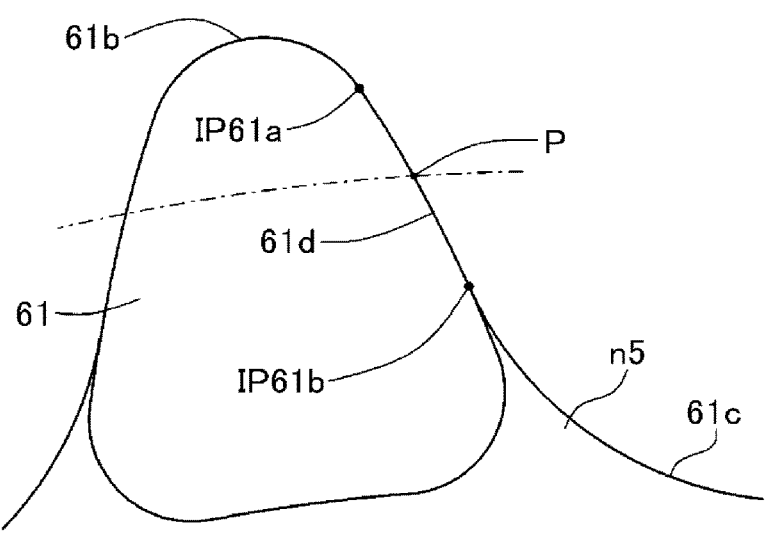
FIG. 7 is an enlarged fragmentary view of FIG. 4.
Figure 8:
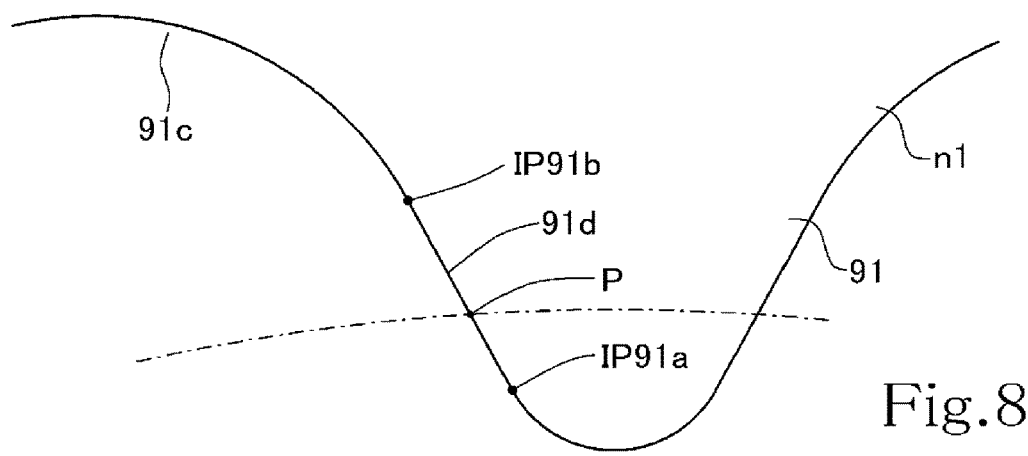
FIG. 8 is an enlarged fragmentary view of FIG. 5.

FIG. 7 depicts an inflection point IP61a on each dowel 61 of the transmission gear n5 between a curved surface of the dowel tip end 61b of the dowel 61 and the abutment surface 61d thereof for abutment against a dowel column 91, and an inflection point IP61b on the dowel 61 between a curved surface of the dowel base end 61c of the dowel 61 and the abutment surface 61d thereof. FIG. 8 depicts an inflection point IP91a on each dowel column 91 of the transmission gear n1 between a curved surface of the dowel column tip end 91b of the dowel column 91 and the abutment surface 91d thereof for abutment against a dowel 61, and an inflection point IP91b on the dowel column 91 between a curved surface of the dowel column base end 91c of the dowel column 91 and the abutment surface 91d thereof.

Figure 9:
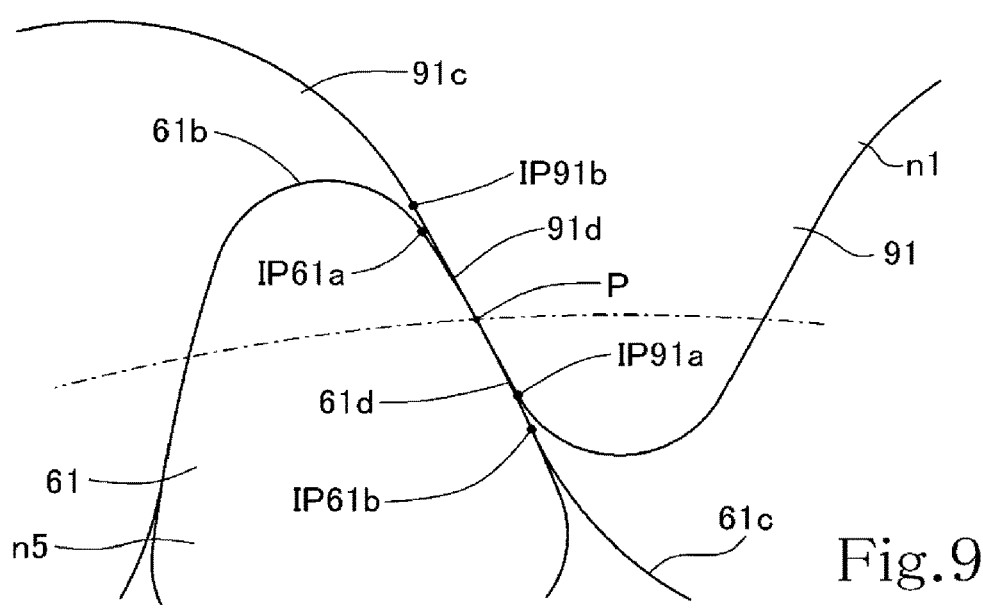
FIG. 9 is an enlarged fragmentary view of FIG. 6.

As depicted in FIG. 9, the inflection point IP91b is positioned radially outwardly of the inflection point IP61a, while the inflection point IP61b is positioned radially inwardly of the inflection point IP91a. Therefore, the dowels 61 and the dowel columns 91 can be brought more closely to each other, making it possible to increase the numbers of the dowels 61 and the dowel columns 91.

As shown in FIG. 4, the transmission gear n5 has an inner circumferential stiffener ring 71 joining the radially inward portions of the twelve dowels 61. As also depicted in FIG. 3, the transmission gear n5 also has a dowel back plate 81 on a side thereof opposite the side thereof from which the dowels 61 project, the dowel back plate 81 joining and reinforcing the dowels 61 and the inner circumferential stiffener ring 71. As depicted in FIG. 5, the transmission gear n1 has an outer circumferential stiffener ring 111 joining the radially outward portions of the twelve dowel columns 91. As also depicted in FIG. 3, the transmission gear n1 also has a dowel column back plate 121 opposite the dowel columns 91, the dowel column back plate 121 joining and reinforcing the dowel columns 91 and the outer circumferential stiffener ring 111.

The transmission gear n6 and the transmission gear n2 that engage each other in the second gear position, the transmission gear n5 and the transmission gear n3 that engage each other in the third gear position, the transmission gear n6 and the transmission gear n4 that engage each other in the fourth gear position, the transmission gear m3 and the transmission gear m5 that engage each other in the fifth gear position, and the transmission gear m4 and the transmission gear m6 that engage each other in the sixth gear position will be described below.

Figure 10:
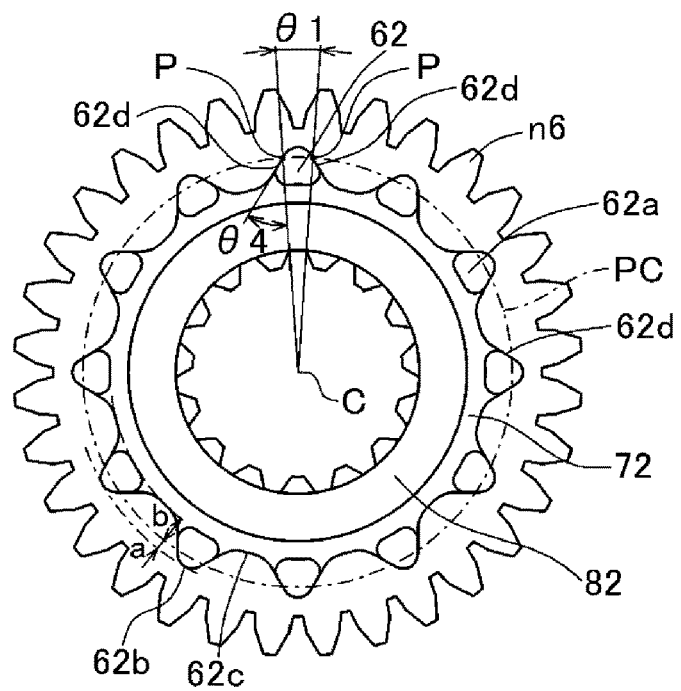
FIG. 10 is a right-hand side elevational view of a transmission gear n6.
Figure 11:
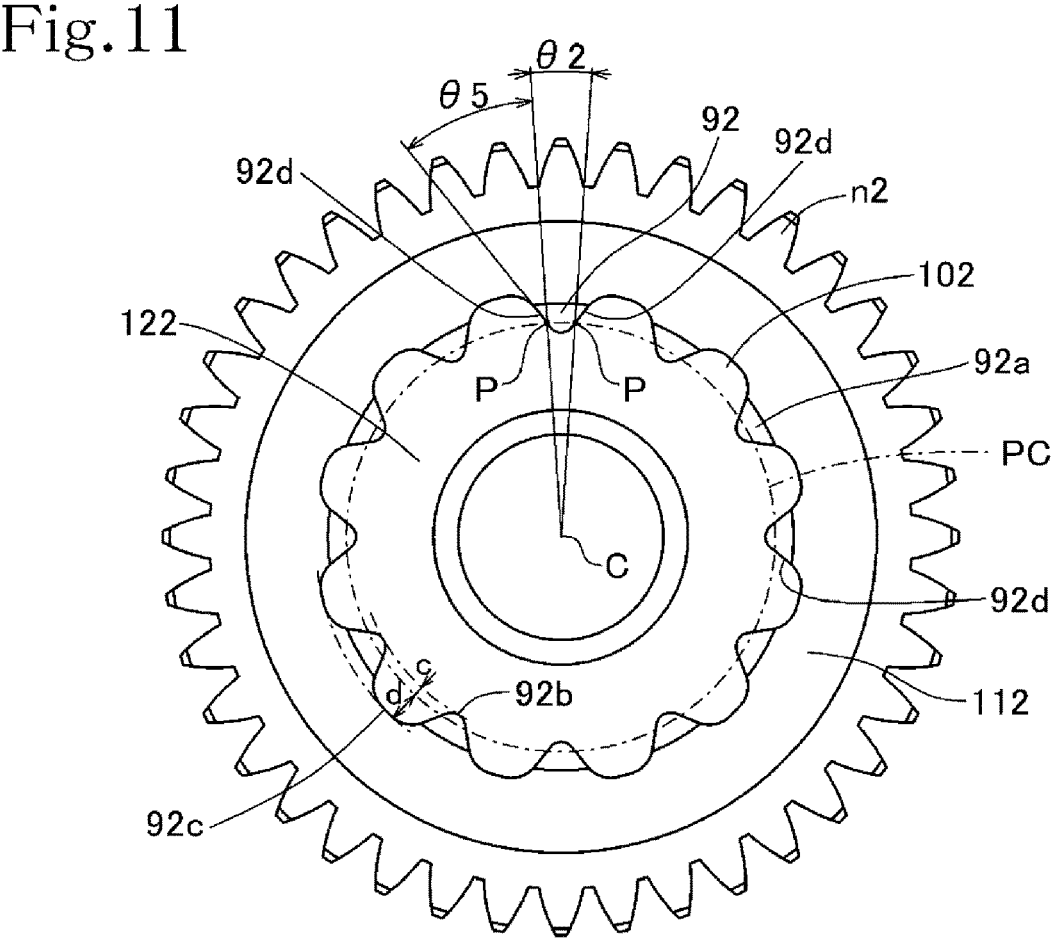
FIG. 11 is a left-hand side elevational view of a transmission gear n2.
Figure 12:
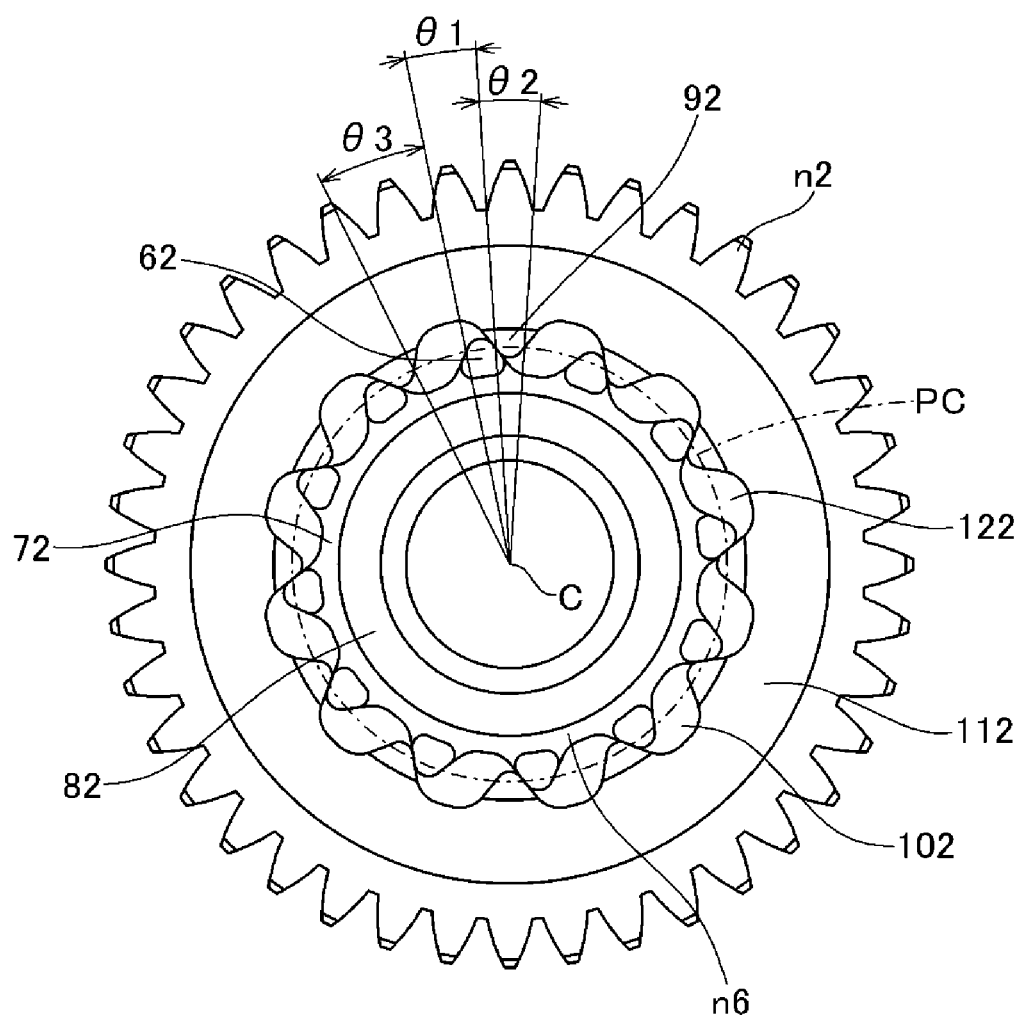
FIG. 12 is a side elevational view depicting an engaged state of the transmission gear n6 and the transmission gear n2 in a second gear position.

The transmission gear n6 and the transmission gear n2 that engage each other in the second gear position are depicted in FIGS. 10 through 12. FIG. 10 is a right-hand side elevational view of the transmission gear n6, FIG. 11 is a left-hand side elevational view of the transmission gear n2, and FIG. 12 is a side elevational view depicting an engaged state of the transmission gear n6 and the transmission gear n2 in the second gear position. As depicted in FIGS. 10 through 12, the transmission gear n6 has dowels 62, an inner circumferential stiffener ring 72, and a dowel back plate 82, and the transmission gear n2 has dowel columns 92, dowel holes 102, an outer circumferential stiffener ring 112, and a dowel back plate 122. As depicted in FIG. 3, the transmission gear n6 and the transmission gear n2 are disposed adjacent to each other on the countershaft 35. When the rider operates the shift pedal to select the second gear position, the fourth shift fork 43d of the transmission gear shifting mechanism 40 is moved to the right, moving the transmission gear n6 to the right until the transmission gear n6 and the transmission gear n2 engage each other.

Figure 13:
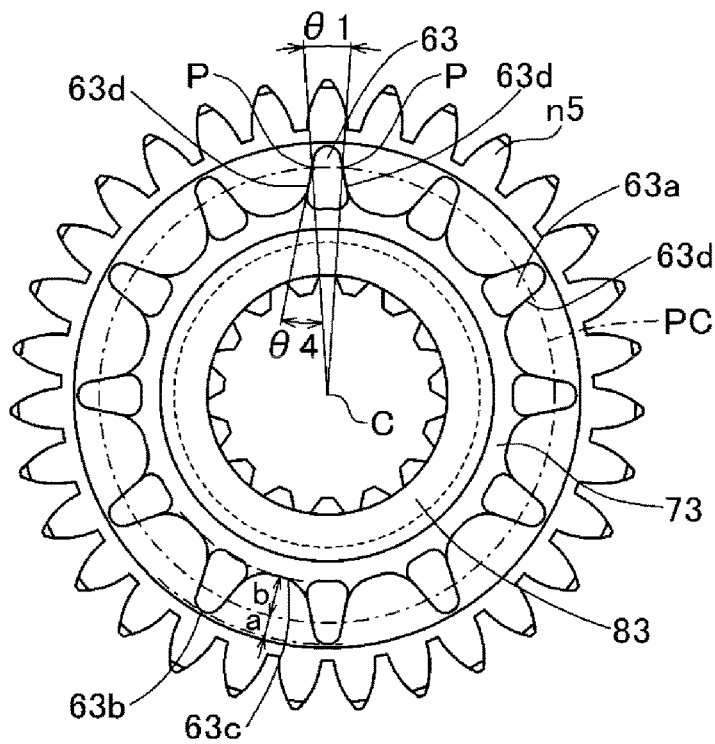
FIG. 13 is a right-hand side elevational view of the transmission gear n5.
Figure 14:
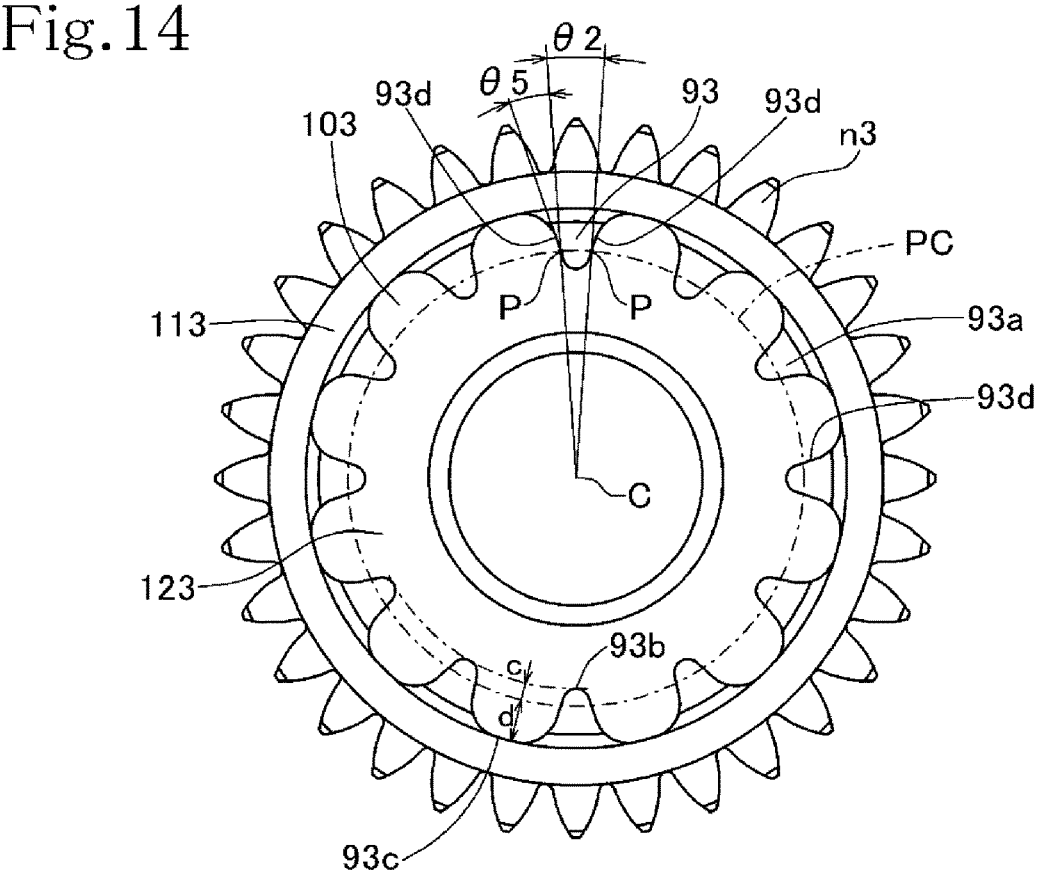
FIG. 14 is a left-hand side elevational view of a transmission gear n3.
Figure 15:
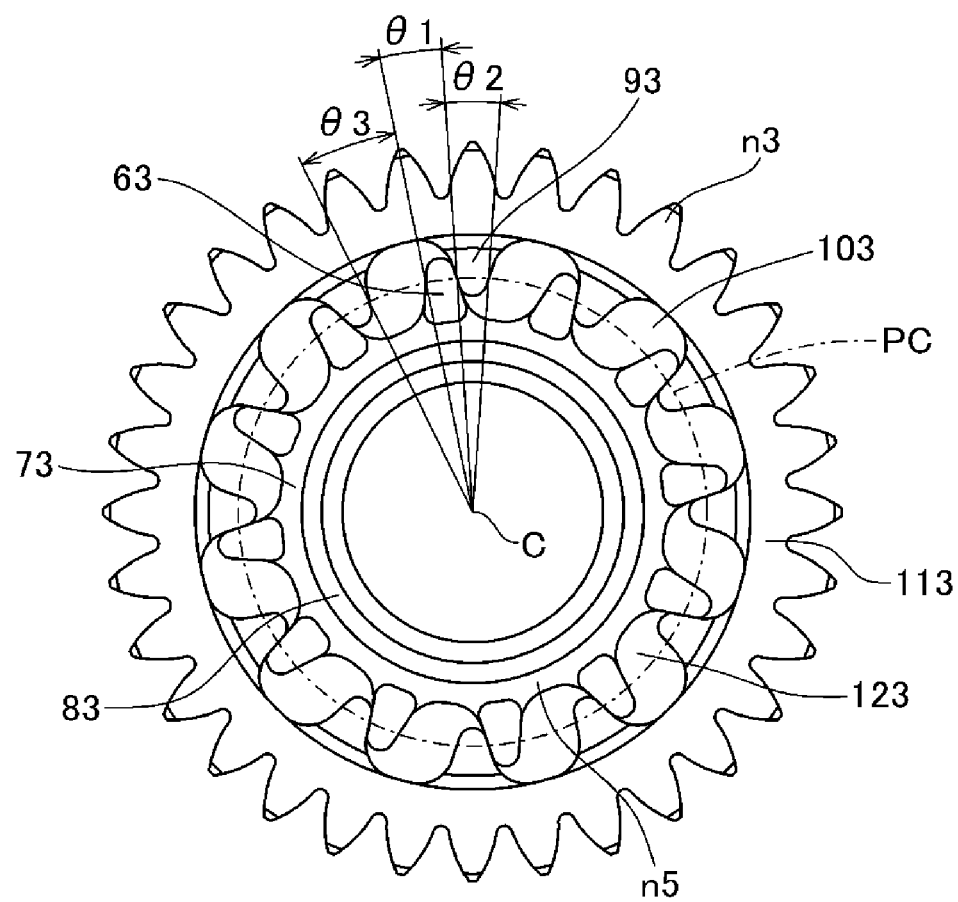
FIG. 15 is a side elevational view depicting an engaged state of the transmission gear n5 and the transmission gear n3 in a third gear position.

The transmission gear n5 and the transmission gear n3 that engage each other in the third gear position are depicted in FIGS. 13 through 15. FIG. 13 is a right-hand side elevational view of the transmission gear n5, FIG. 14 is a left-hand side elevational view of the transmission gear n3, and FIG. 15 is a side elevational view depicting an engaged state of the transmission gear n5 and the transmission gear n3 in the third gear position. As depicted in FIGS. 13 through 15, the transmission gear n5 has dowels 63, an inner circumferential stiffener ring 73, and a dowel back plate 83, and the transmission gear n3 has dowel columns 93, dowel holes 103, an outer circumferential stiffener ring 113, and a dowel back plate 123. As depicted in FIG. 3, the transmission gear n5 and the transmission gear n3 are disposed adjacent to each other on the countershaft 35. When the rider operates the shift pedal to select the third gear position, the first shift fork 43a of the transmission gear shifting mechanism 40 is moved to the right, moving the transmission gear n5 to the right until the transmission gear n5 and the transmission gear n3 engage each other.

Figure 16:
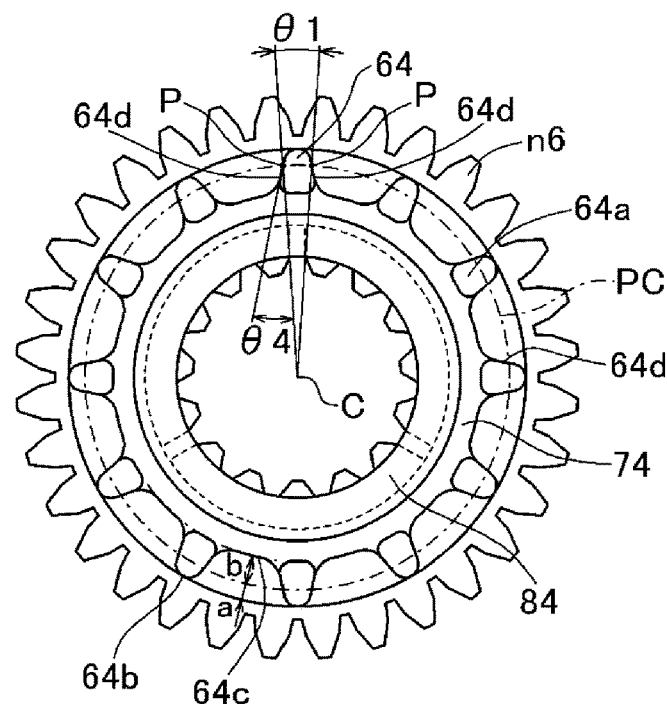
FIG. 16 is a left-hand side elevational view of the transmission gear n6.
Figure 17:
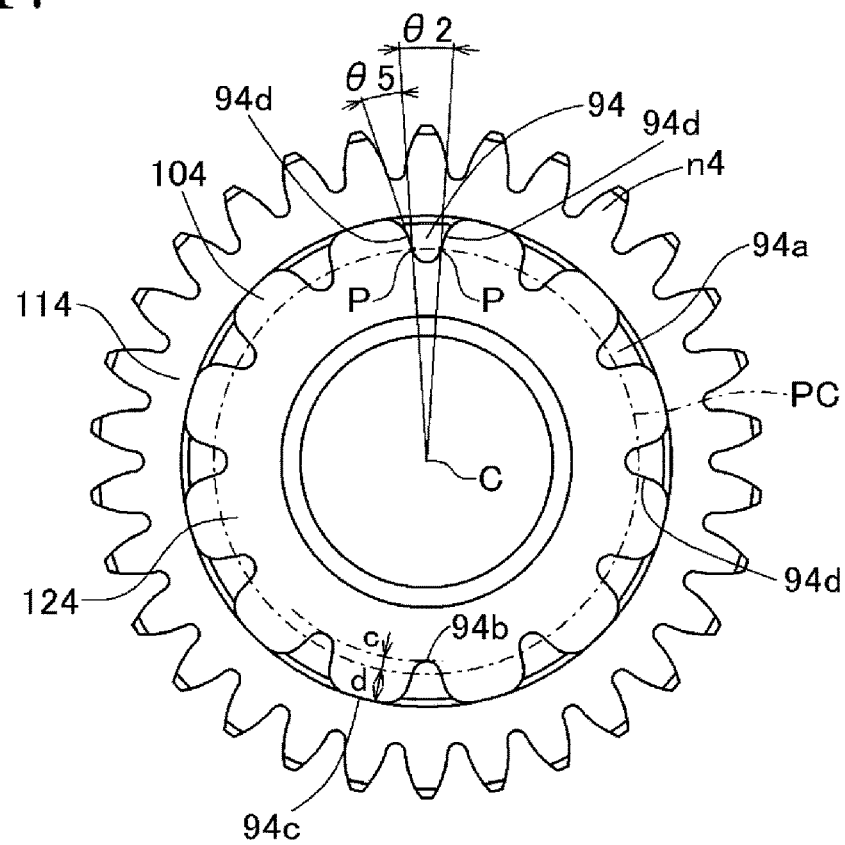
FIG. 17 is a right-hand side elevational view of a transmission gear n4.
Figure 18:
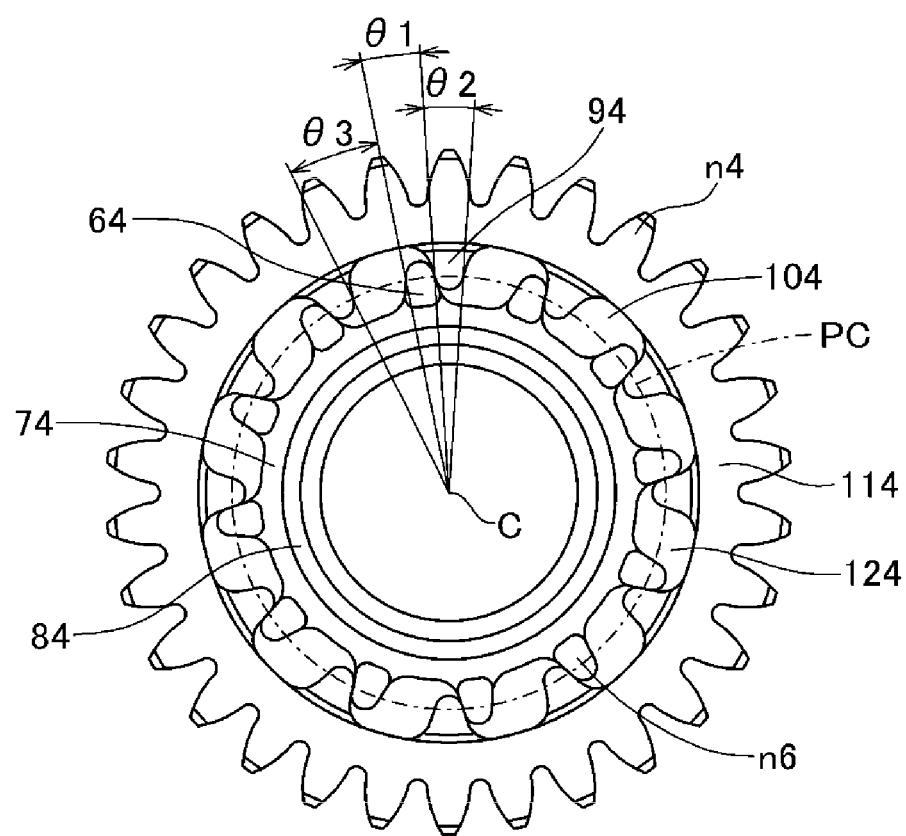
FIG. 18 is a side elevational view depicting an engaged state of the transmission gear n6 and the transmission gear n4 in a fourth gear position.

The transmission gear n6 and the transmission gear n4 that engage each other in the fourth gear position are depicted in FIGS. 16 through 18. FIG. 16 is a left-hand side elevational view of the transmission gear n6, FIG. 17 is a right-hand side elevational view of the transmission gear n4, and FIG. 18 is a side elevational view depicting an engaged state of the transmission gear n6 and the transmission gear n4 in the fourth gear position. As depicted in FIGS. 16 through 18, the transmission gear n6 has dowels 64, an inner circumferential stiffener ring 74, and a dowel back plate 84, and the transmission gear n4 has dowel columns 94, dowel holes 104, an outer circumferential stiffener ring 114, and a dowel back plate 124. As depicted in FIG. 3, the transmission gear n6 and the transmission gear n4 are disposed adjacent to each other on the countershaft 35. When the rider operates the shift pedal to select the fourth gear position, the fourth shift fork 43d of the transmission gear shifting mechanism 40 is moved to the left, moving the transmission gear n6 to the left until the transmission gear n6 and the transmission gear n4 engage each other.

Figure 19:
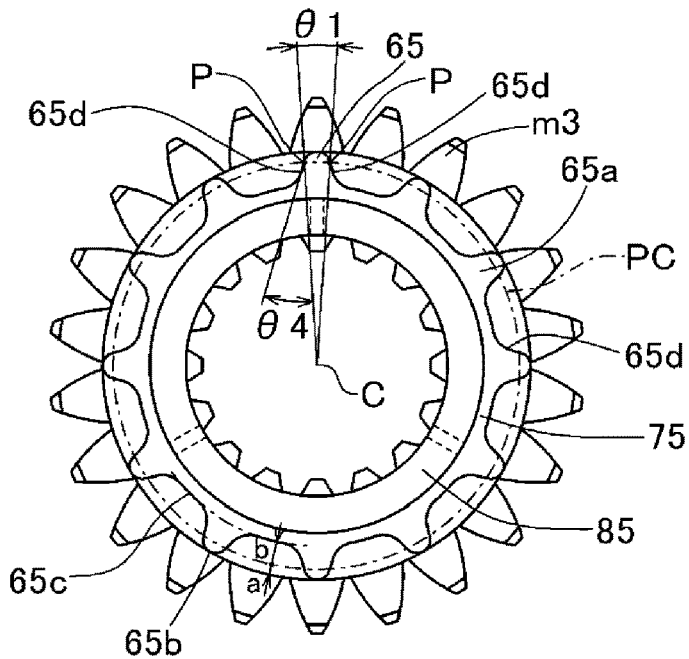
FIG. 19 is a left-hand side elevational view of a transmission gear m3.
Figure 20:
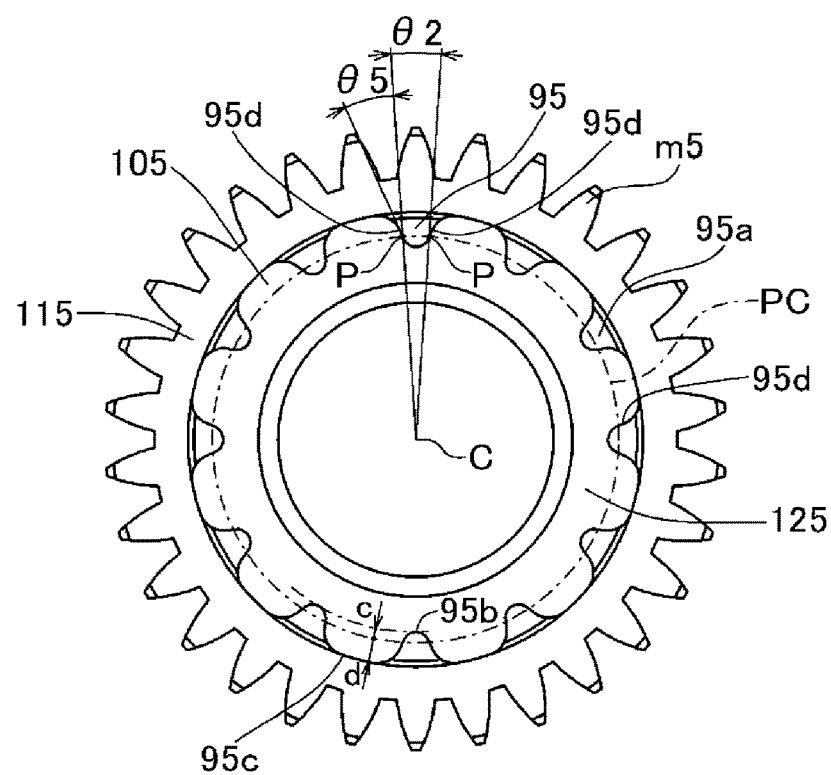
FIG. 20 is a right-hand side elevational view of a transmission gear m5.
Figure 21:
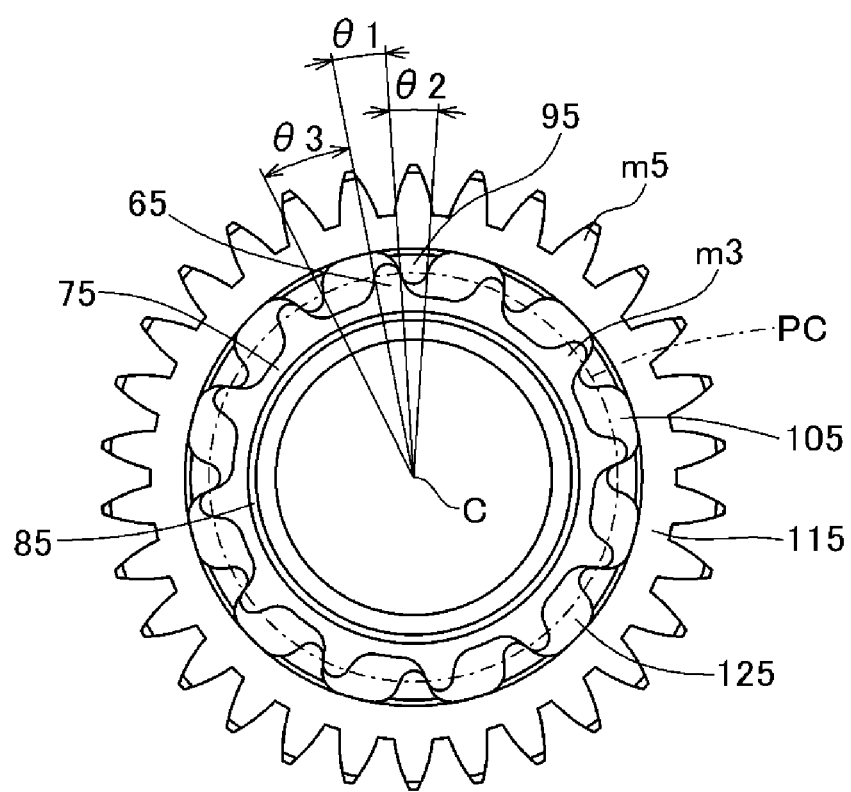
FIG. 21 is a side elevational view depicting an engaged state of the transmission gear m3 and the transmission gear m5 in a fifth gear position.

The transmission gear m3 and the transmission gear m5 that engage each other in the fifth gear position are depicted in FIGS. 19 through 21. FIG. 19 is a left-hand side elevational view of the transmission gear m3, FIG. 20 is a right-hand side elevational view of the transmission gear m5, and FIG. 21 is a side elevational view depicting an engaged state of the transmission gear m3 and the transmission gear m5 in the fifth gear position. As depicted in FIGS. 19 through 21, the transmission gear m3 has dowels 65, an inner circumferential stiffener ring 75, and a dowel back plate 85, and the transmission gear m5 has dowel columns 95, dowel holes 105, an outer circumferential stiffener ring 115, and a dowel back plate 125. As depicted in FIG. 3, the transmission gear m3 and the transmission gear m5 are disposed adjacent to each other on the main shaft 31. When the rider operates the shift pedal to select the fifth gear position, the second shift fork 43b of the transmission gear shifting mechanism 40 is moved to the left, moving the transmission gear m3 to the left until the transmission gear m3 and the transmission gear m5 engage each other.

Figure 22:
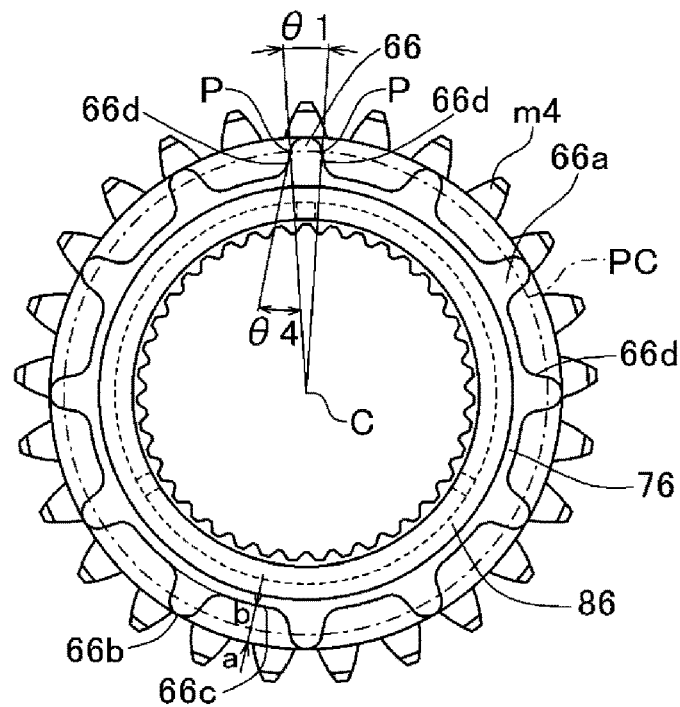
FIG. 22 is a right-hand side elevational view of a transmission gear m4.
Figure 23:
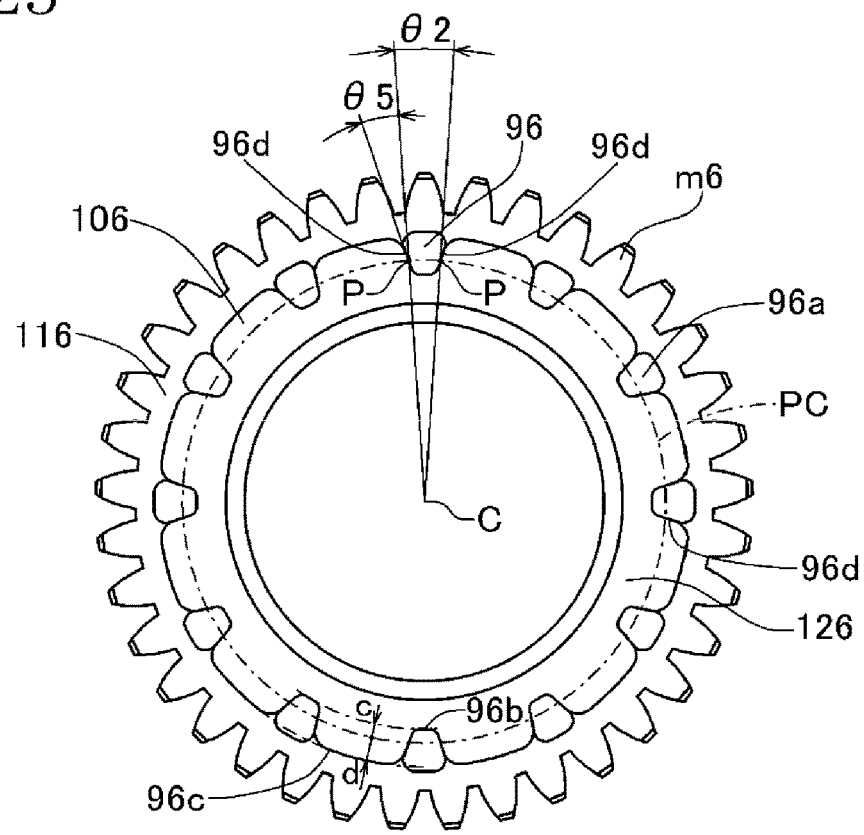
FIG. 23 is a left-hand side elevational view of a transmission gear m6.
Figure 24:
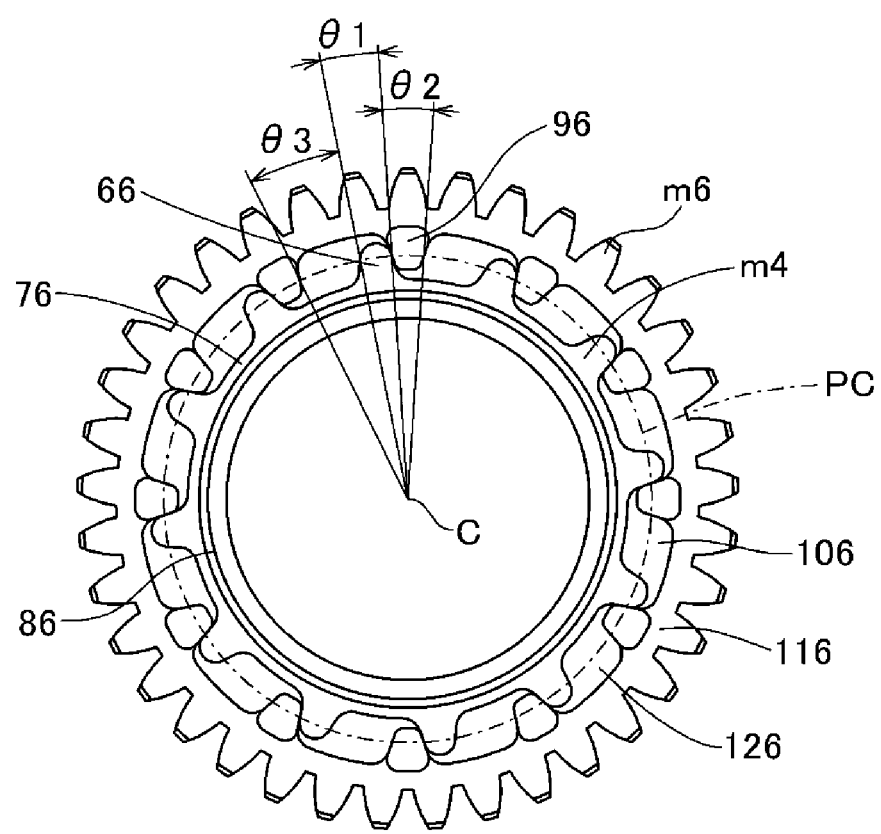
FIG. 24 is a side elevational view depicting an engaged state of the transmission gear m4 and the transmission gear m6 in a sixth gear position.

The transmission gear m4 and the transmission gear m6 that engage each other in the sixth gear position are depicted in FIGS. 22 through 24. FIG. 22 is a right-hand side elevational view of the transmission gear m4, FIG. 23 is a left-hand side elevational view of the transmission gear m6, and FIG. 24 is a side elevational view depicting an engaged state of the transmission gear m4 and the transmission gear m6 in the sixth gear position. As depicted in FIGS. 22 through 24, the transmission gear m4 has dowels 66, an inner circumferential stiffener ring 76, and a dowel back plate 86, and the transmission gear m6 has dowel columns 96, dowel holes 106, an outer circumferential stiffener ring 116, and a dowel back plate 126. As depicted in FIG. 3, the transmission gear m4 and the transmission gear m6 are disposed adjacent to each other on the main shaft 31. When the rider operates the shift pedal to select the sixth gear position, the third shift fork 43c of the transmission gear shifting mechanism 40 is moved to the right, moving the transmission gear m4 to the right until the transmission gear m4 and the transmission gear m6 engage each other.

The dowels 62, 63, 64, 65, and 66 on the right side surface of the transmission gear n6, the right side surface of the transmission gear n5, the left side surface of the transmission gear n6, the left side surface of the transmission gear m3, and the right side surface of the transmission gear m4 have a length "a" from the pitch circle PC to dowel tip ends 62b, 63b, 64b, 65b, and 66b thereof, and a length "b" from the pitch circle PC to dowel base ends 62c, 63c, 64c, 65c, and 66c thereof, the length "a" being smaller than the length "b," e.g., a<b.

The dowel columns 92, 93, 94, 95, and 96 on the left side surface of the transmission gear n2, the left side surface of the transmission gear n3, the right side surface of the transmission gear n4, the right side surface of the transmission gear m5, and the left side surface of the transmission gear m6 have a length "c" from the pitch circle PC to dowel column tip ends 92b, 93b, 94b, 95b, and 96b thereof, and a length "d" from the pitch circle PC to dowel column base ends 92c, 93c, 94c, 95c, and 96c thereof, the length "c" being smaller than the length "d," e.g., c<d.

Since the length "b" from the pitch circle PC to the dowel base ends 62c, 63c, 64c, 65c, and 66c is larger than the length "a" from the pitch circle PC to the dowel tip ends 62b, 63b, 64b, 65b, and 66b, and the length "d" from the pitch circle PC to the column base ends 92c, 93c, 94c, 95c, and 96c is larger than the length "c" from the pitch circle PC to the dowel column tip ends 92b, 93b, 94b, 95b, and 96b, the dowels 62, 63, 64, 65, and 66 and the dowel columns 92, 93, 94, 95, and 96 have their mechanical strength increased.

Furthermore, inflection points IP92b, IP93b, IP94b, IP95b, and IP96b between the curved surfaces of the dowel column base ends 92c, 93c, 94c, 95c, and 96c of the dowel columns 92, 93, 94, 95, and 96 and abutment surfaces 92d, 93d, 94d, 95d, and 96d of the dowel columns 92, 93, 94, 95, and 96 for abutment against the dowels 62, 63, 64, 65, and 66 are positioned radially outwardly of inflection points IP62a, IP63a, IP64a, IP65a, and IP66a between the curved surfaces of the dowel tip ends 62b, 63b, 64b, 65b, and 66b of the dowels 62, 63, 64, 65, and 66 and abutment surfaces 62d, 63d, 64d, 65d, and 66d of the dowels 62, 63, 64, 65, and 66 for abutment against the dowel columns 92, 93, 94, 95, and 96.

Moreover, inflection points IP62b, IP63b, IP64b, IP65b, and IP66b between the curved surfaces of the dowel base ends 62c, 63c, 64c, 65c, and 66c of the dowels 62, 63, 64, 65, and 66 and the abutment surfaces 62d, 63d, 64d, 65d, and 66d of the dowels 62, 63, 64, 65, and 66 for abutment against the dowel columns 92, 93, 94, 95, and 96 are positioned radially inwardly of inflection points IP92a, IP93a, IP94a, IP95a, and IP96a between the curved surfaces of the bowel column tip ends 92b, 93b, 94b, 95b, and 96b of the dowel columns 92, 93, 94, 95, and 96 and the abutment surfaces 92d, 93d, 94d, 95d, and 96d of the dowel columns 92, 93, 94, 95, and 96 for abutment against the dowels 62, 63, 64, 65, and 66.

Various conditions for the pairs of the transmission gears in the first through sixth gear positions, i.e., the number of dowels N, dowel nipping angle θ1, dowel column nipping angle θ2, backlash angle θ3, whether there is an inner circumferential stiffener ring or not, whether there is an outer circumferential stiffener ring or not, whether the relationship a<b is satisfied or not, whether the relationship c<d is satisfied or not, dowel spreading angle θ4, and dowel column spreading angle θ5, are depicted in Table 1 below.

In Table 1 below, those transmission gears which are provided with an inner circumferential stiffener ring and an outer circumferential stiffener ring are indicated by "○," and those not provided with an inner circumferential stiffener ring and an outer circumferential stiffener ring are indicated by "x."

TABLE 1

|  | 1st gear position | 2nd gear position | 3rd gear position | 4th gear position | 5th gear position | 6th gear position |
|---|---|---|---|---|---|---|
| Number of dowels N | 12 | 12 | 12 | 12 | 12 | 12 |
| Dowel nipping angle θ1 | 7.4 | 7.5 | 7.6 | 7.5 | 7.5 | 7.5 |
| Dowel column nipping angle θ2 | 7.4 | 7.5 | 7.6 | 7.5 | 7.5 | 7.5 |
| Backlash angle θ3 | 14.8 | 15 | 14.8 | 15 | 15 | 15 |
| Inner circumferential stiffener ring | ○ | ○ | ○ | ○ | ○ | ○ |
| Outer circumferential stiffener ring | ○ | ○ | ○ | ○ | ○ | ○ |
| a < b | ○ | ○ | ○ | ○ | ○ | ○ |
| c < d | ○ | ○ | ○ | ○ | ○ | ○ |
| Dowel spreading angle θ4 | 25 | 35 | 15 | 15 | 20 | 15 |
| Dowel column spreading angle θ5 | 25 | 35 | 15 | 15 | 20 | 15 |

According to Inventive Example 1, in each gear position, the numbers of the dowels 61, 62, 63, 64, 65, and 66 and the dowel columns 91, 92, 93, 94, 95, and 96 are twelve, so that dowel nipping angle θ1 and dowel column nipping angle θ2 are smaller than heretofore. In order to increase the mechanical strength of the dowels 61, 62, 63, 64, 65, and 66 and the dowel columns 91, 92, 93, 94, 95, and 96, the transmission gears are provided with the inner circumferential stiffener rings 71, 72, 73, 74, 75, and 76 radially inwardly of the dowels 61, 62, 63, 64, 65, and 66, with the dowel back plates 81, 82, 83, 84, 85, and 86, with the outer circumferential stiffener rings 111, 112, 113, 114, 115, and 116 radially outwardly of the dowel columns 91, 92, 93, 94, 95, and 96, and with the dowel column back plates 121, 122, 123, 124, 125, and 126, and the length "a" from the pitch circle PC to the dowel tip ends 61b, 62b, 63b, 64b, 65b, and 66b is smaller than the length "b" from the pitch circle PC to the dowel base ends 61c, 62c, 63c, 64c, 65c, and 66c, and the length "c" from the pitch circle PC to the dowel column tip ends 91b, 92b, 93b, 94b, 95b, and 96b is smaller than the length "d" from the pitch circle PC to the dowel column base ends 91c, 92c, 93c, 94c, 95c, and 96c of the dowel columns 91, 92, 93, 94, 95, and 96.

Using the transmission apparatus according to the present invention, experiments were conducted to measure shift spindle angles α, drum angles β, and shift pedal loads F over shift time T, and their relationships are illustrated in graphs depicted in FIGS. 25 through 35. The relationship between invalid engagement times TM and shift pedal loads F borne by the shift pedal was verified. An invalid engagement time TM refers to a period of time during which the facing wall surfaces of dowels and the facing wall surfaces of dowel columns abut and slide against each other when a gear shifting operation is performed.

In the experiments, the transmission apparatus according to the present invention was used, and data were measured a plurality of times using a single jig under conditions represented by an engine rotational speed Ne of 200 rpm, a main shaft rotational speed of 100 rpm, and manual gear shifting operations. From the measured data, there were extracted experimental results which indicate invalid engagement times TM of 0 msec. (millisecond), 5 msec., 10 msec., 15 msec., 30 msec., 35 msec., 40 msec., 55 msec., 75 msec., 100 msec., and 120 msec. The experimental results are depicted in FIGS. 25 through 35 as representing the relationship between shift time T on the horizontal axis and shift spindle angle α on the vertical axis in FIGS. 25(a) through 35(a), the relationship between shift time T on the horizontal axis and drum angle β on the vertical axis in FIGS. 25(b) through 35(b), and the relationship between shift time T on the horizontal axis and shift pedal load F on the vertical axis in FIGS. 25(c) through 35(c).

The extraction of the invalid engagement time TM will be described below with reference to FIGS. 29(a) through 29(c), for example. In FIG. 29(b) which illustrates the relationship between shift time T and drum angle β, there is an area where even when shift time T passes, drum angle β remains unvaried between its maximum and minimum values in the graph from the start to end of a process in which drum angle β is variable. This area represents a period of time in which the facing wall surfaces of the dowels and the facing wall surfaces of dowel columns abut and slide against each other, preventing the gear from moving axially further, and the period of time may be referred to as invalid engagement time TM. In FIG. 29(b), invalid engagement time TM can be read as 30 msec. The experimental results were thus extracted as indicating the invalid engagement times TM of the above values.

The relationship between shift time T and shift pedal load F at each invalid engagement time TM will be reviewed below with reference to FIGS. 25(b) and 25(c) through 35(b) and 35(c). When a gear shifting operation is started, shift pedal load F increases gradually until the facing wall surfaces of the dowels and the facing wall surfaces of dowel columns abut against each other, whereupon invalid engagement time TM begins, resulting in a sharp increase in shift pedal load F. Then, the facing wall surfaces of the dowels and the facing wall surfaces of dowel columns slide against each other, and the dowels enter the dowel holes, finishing invalid engagement time TM. Upon the dowels entering the dowel holes, the dowels and the dowel columns move relatively to other by a distance corresponding to the backlash angle θ3 therebetween, during which time shift pedal load F is ineffective. When the dowels and the dowel columns have moved relatively to other by the distance corresponding to the backlash angle 63, the dowels and the dowel columns abut against each other and are brought into an engaged state, resulting in an increase in shift pedal load F. The gear shifting operation is now ended.

When performing the gear shifting operation on the transmission apparatus, the rider or gearshift operator feels an increase in shift pedal load F because of abutment between the facing wall surfaces of the dowels and the facing wall surfaces of dowel columns. Thereafter, shift pedal load F is lost, and when engagement between the dowels and the dowel columns is completed, the gearshift operator feels an increase in shift pedal load F. If invalid engagement time TM is long, then the gearshift operator tends to feel the gear shifting operation as if performed with a two-stage motion, and does not feel the gear shifting operation as a smooth process. On the other hand, if invalid engagement time TM is short, then the time required for the facing wall surfaces of the dowels and the facing wall surfaces of dowel columns to abut against each other, increasing shift pedal load F, is short, so that the gearshift operator does not feel the gear shifting operation as if performed with a two-stage motion, but feels the gear shifting operation as a smooth process, so that the quality of the gear shifting operation as felt by the gearshift operator is improved.

However, inasmuch as the operation of the shift pedal is affected by a twisting of the shift spindle and an absorption of gear shift shocks by the transmission apparatus, invalid engagement time TM and the time during which the facing wall surfaces of the dowels and the facing wall surfaces of dowel columns to abut against each other, increasing shift pedal load F, are not necessarily in agreement with each other.

With regard to the experimental results which indicated invalid engagement times TM of 0 msec., 5 msec., 10 msec., 15 msec., 30 msec., 35 msec., 40 msec., 55 msec., 75 msec., 100 msec., and 120 msec., as depicted in FIGS. 25 through 35, the relationship between invalid engagement time TM and gear shifting feels has been judged by taking into account the relationship between shift time T and shift pedal load F.

Figure 25:
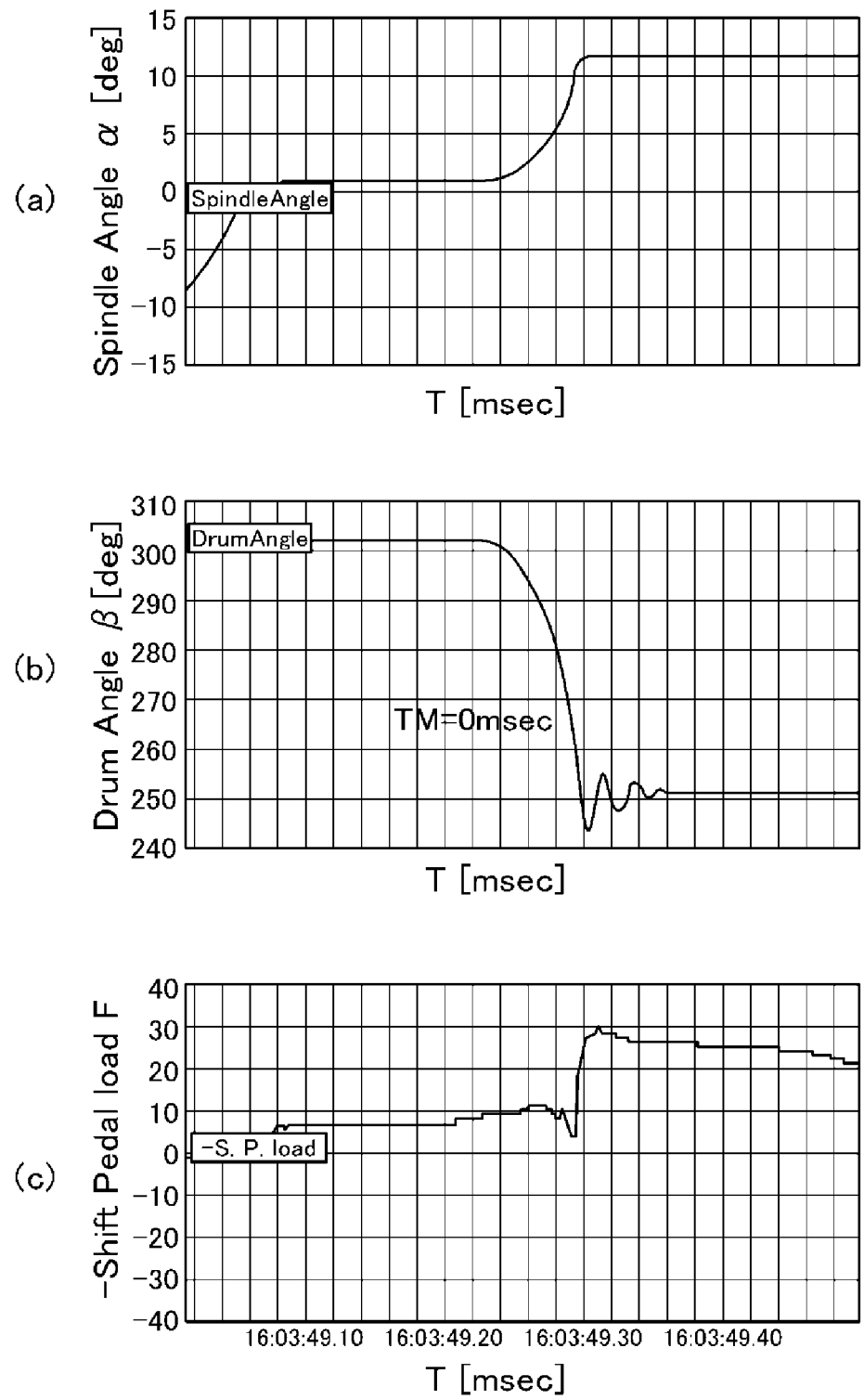
FIG. 25 are views depicting how shift spindle angle α, drum angle β, and shift pedal load F vary over shift time T for an invalid engagement time of 0 msec.
Figure 26:
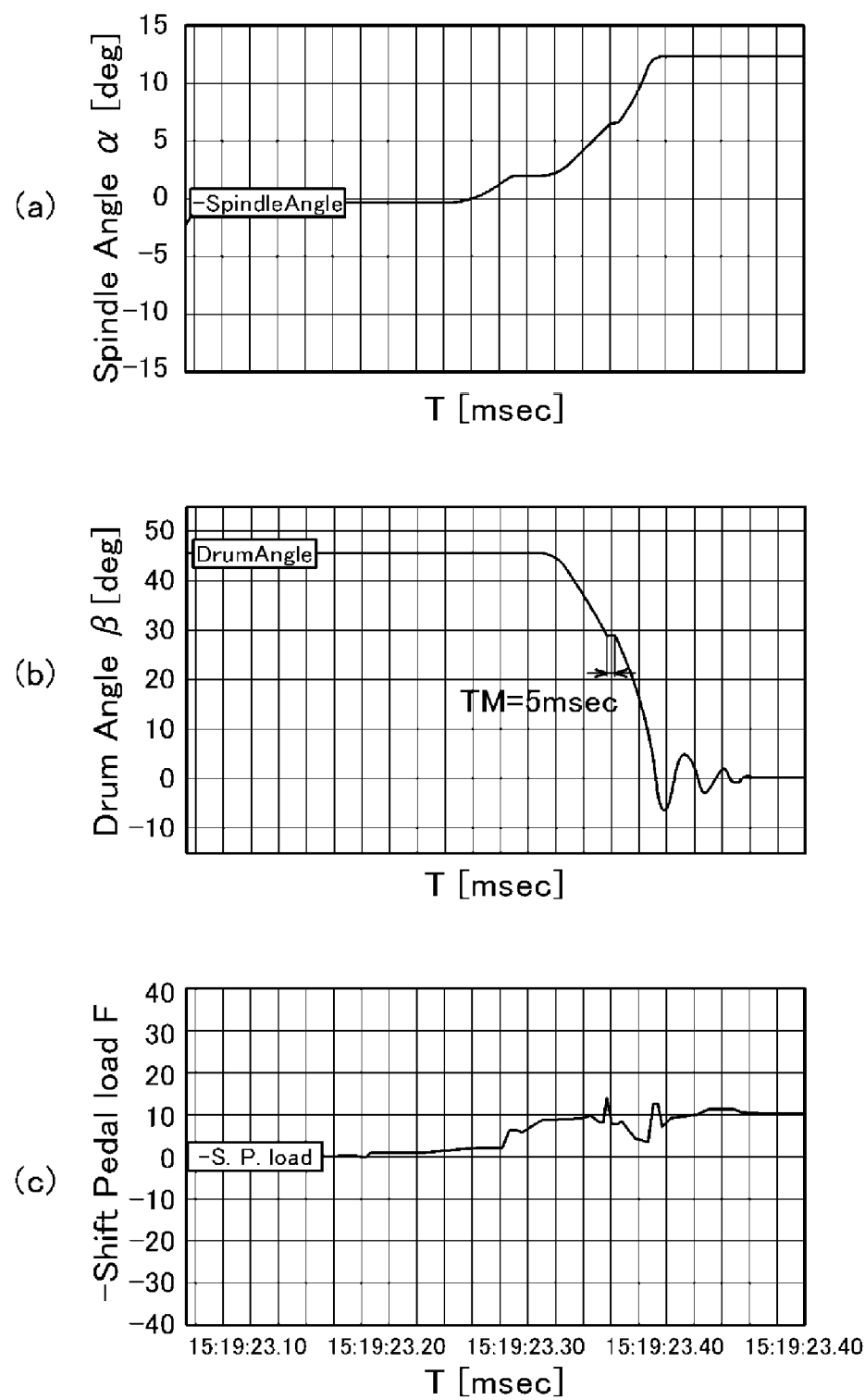
FIG. 26 are views depicting how shift spindle angle α, drum angle β, and shift pedal load F vary over shift time T for an invalid engagement time of 5 msec.
Figure 27:
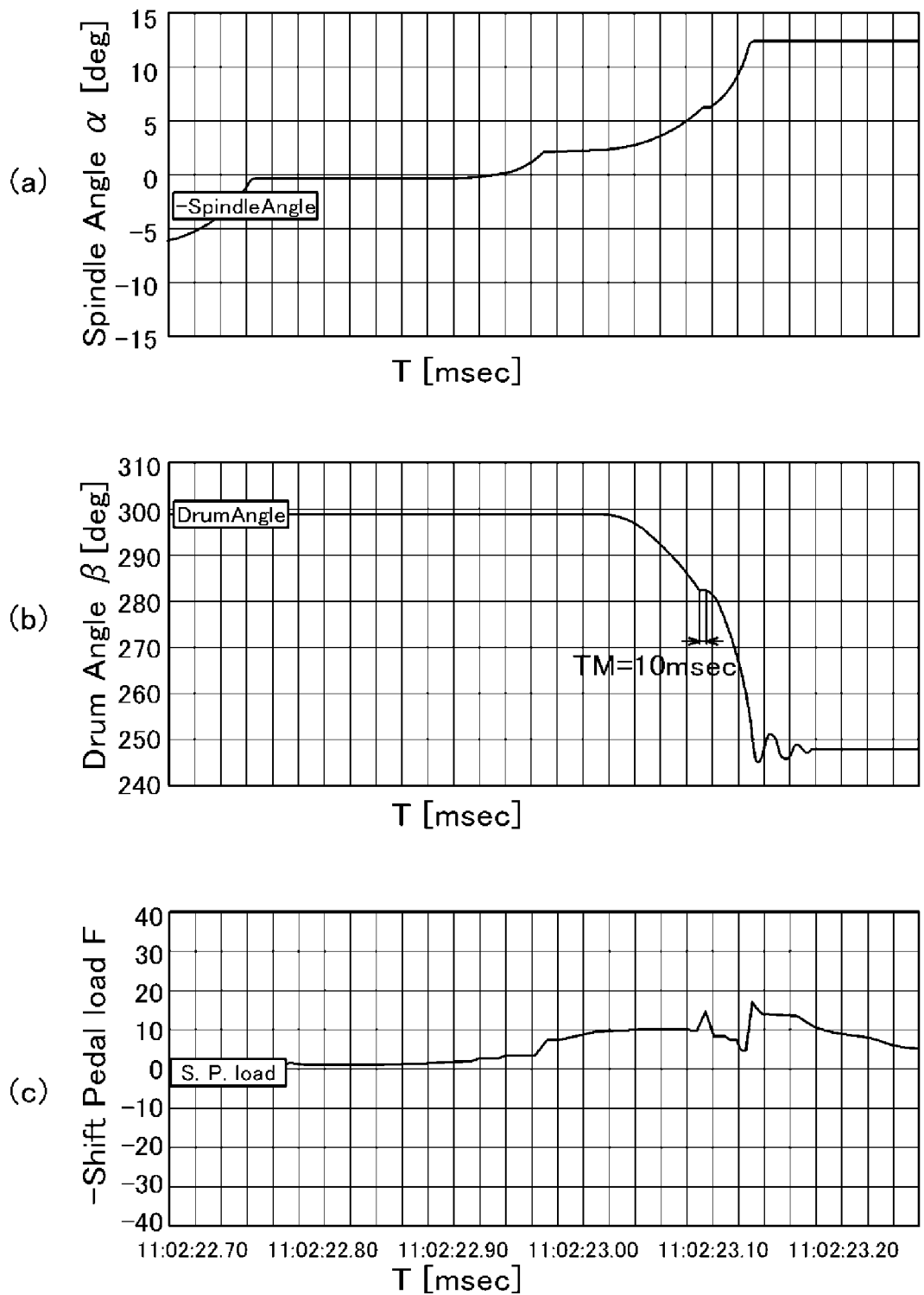
FIG. 27 are views depicting how shift spindle angle α, drum angle β, and shift pedal load F vary over shift time T for an invalid engagement time of 10 msec.

As depicted in FIGS. 25 through 27, according to the experimental results which indicate invalid engagement times TM of 0 msec., 5 msec., 10 msec., the time during which shift pedal load F increases while the facing wall surfaces of the dowels and the facing wall surfaces of dowel columns abut against each other is very short or virtually nil. This is because the transmission gear shifting mechanism is made up of metal components that produce a time lag in their response to gear shifting operations and shift pedal load F, so that shift pedal load F almost does not increase if invalid engagement time TM is short. Therefore, as long as invalid engagement time TM is in the range from 0 msec. to 10 msec., the gearshift operator does not feel a gear shifting operation as if performed with a two-stage motion, but feels the gear shifting operation as a smooth process. It can be seen that the range from 0 msec. to 10 msec. is an optimum range for invalid engagement time TM.

Figure 28:
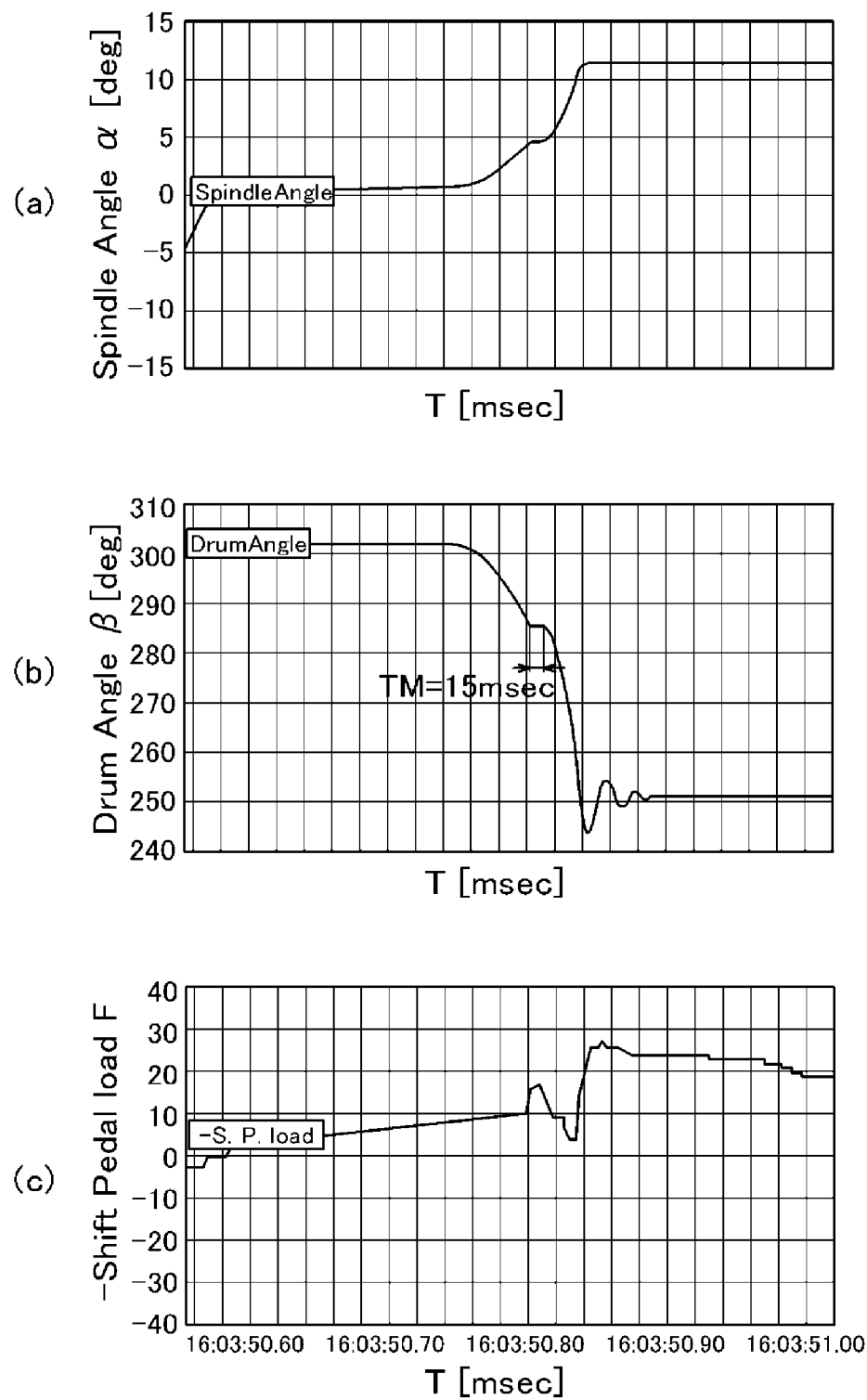
FIG. 28 are views depicting how shift spindle angle α, drum angle β, and shift pedal load F vary over shift time T for an invalid engagement time of 15 msec.
Figure 29:
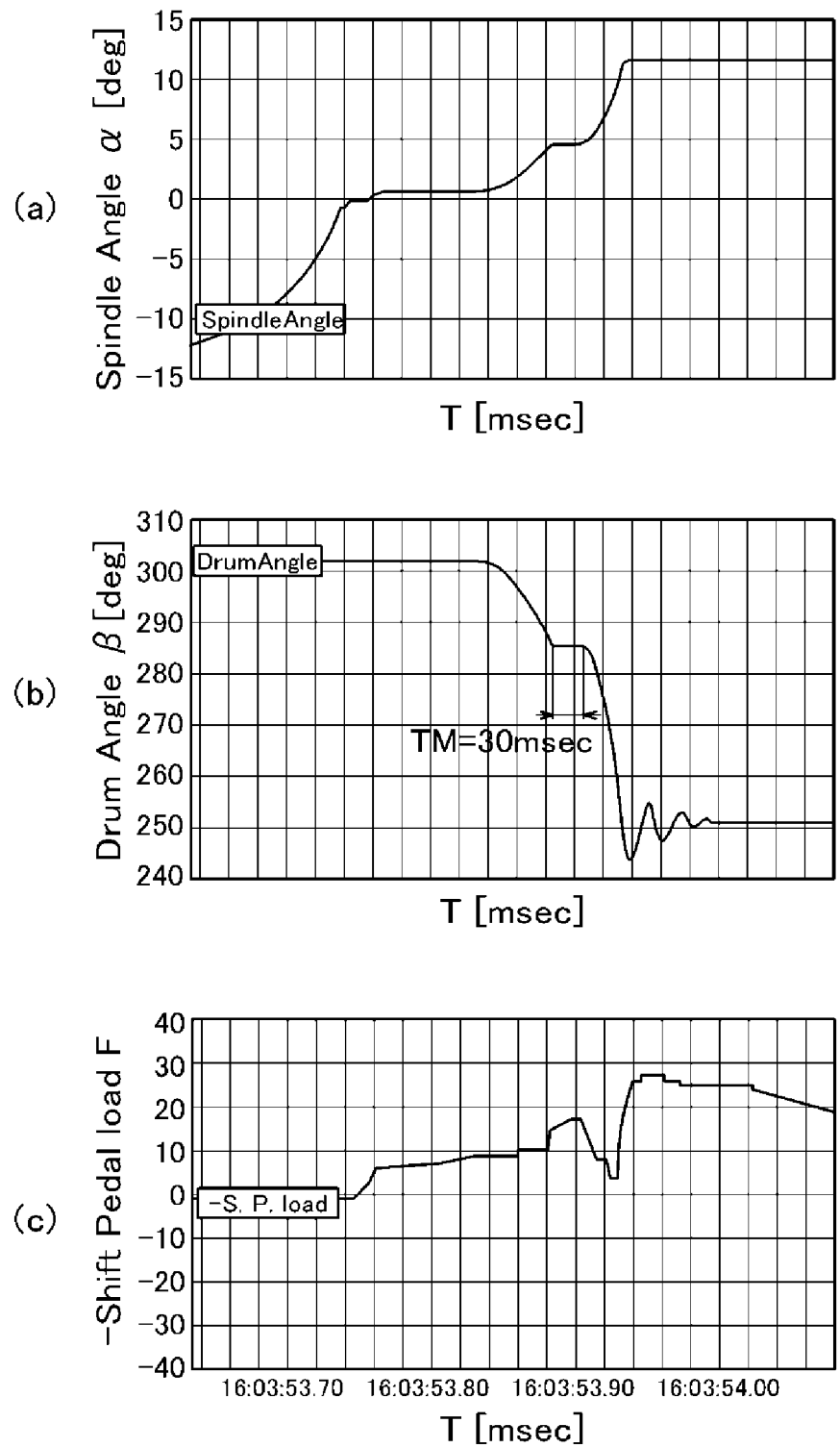
FIG. 29 are views depicting how shift spindle angle α, drum angle β, and shift pedal load F vary over shift time T for an invalid engagement time of 30 msec.
Figure 30:
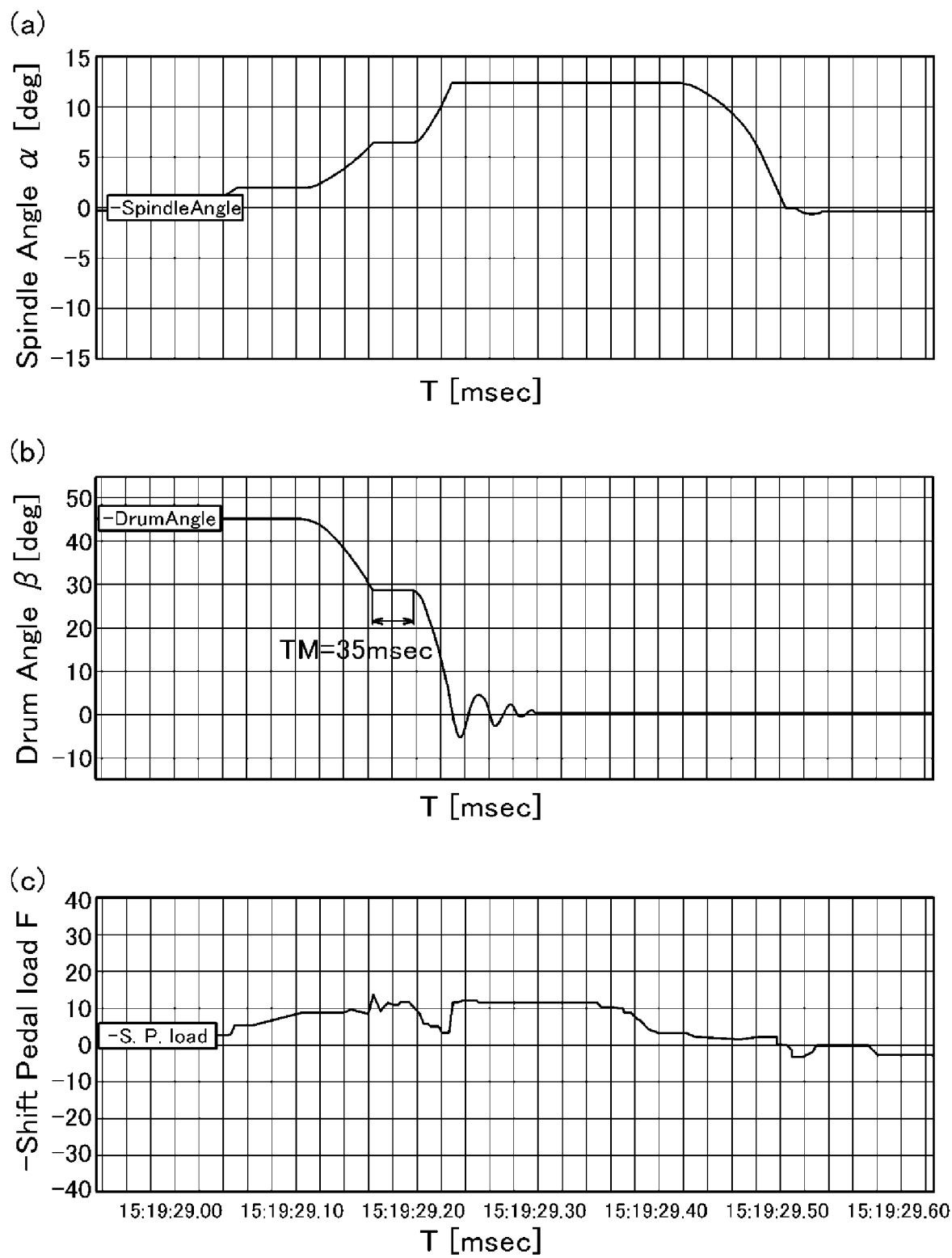
FIG. 30 are views depicting how shift spindle angle α, drum angle β, and shift pedal load F vary over shift time T for an invalid engagement time of 35 msec.
Figure 31:
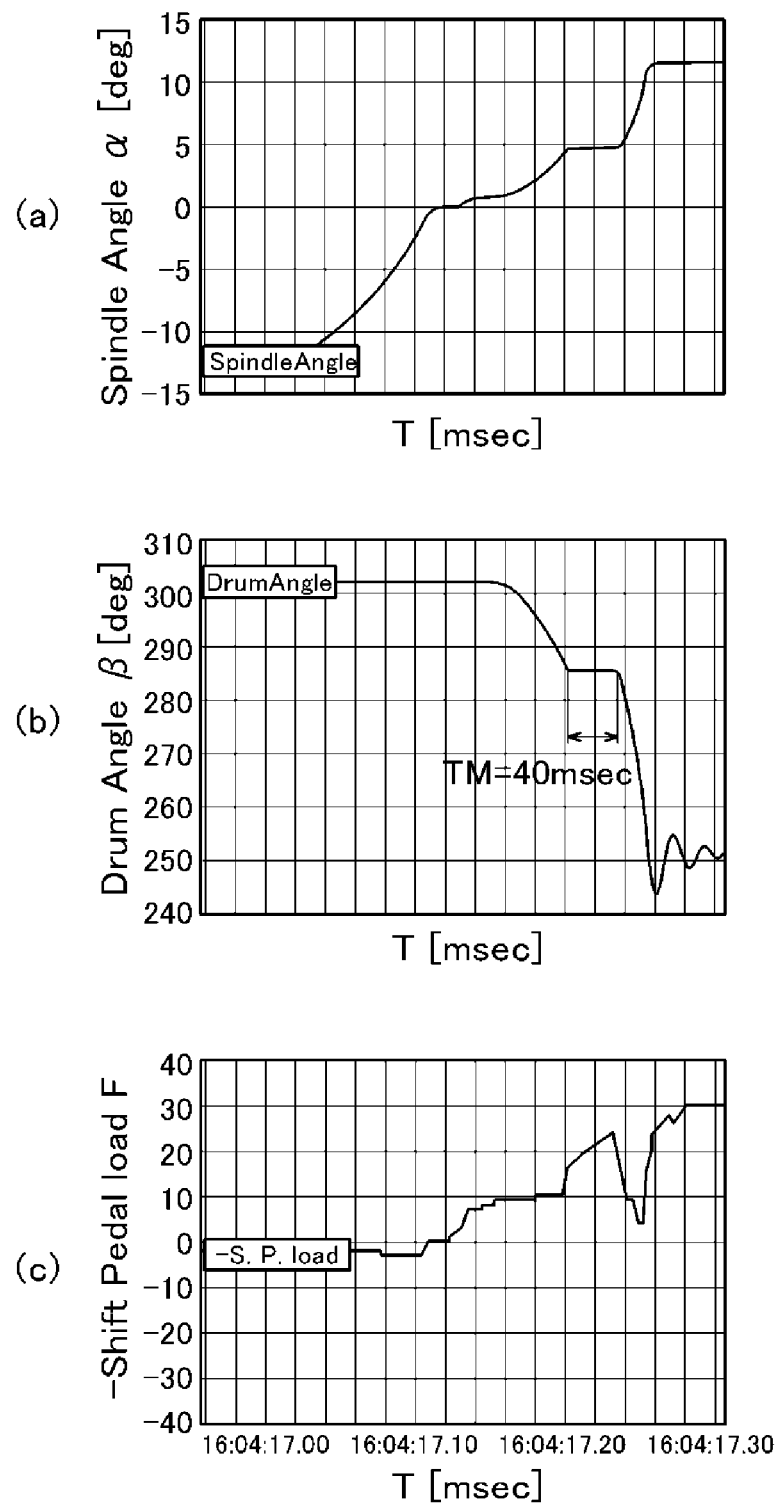
FIG. 31 are views depicting how shift spindle angle α, drum angle β, and shift pedal load F vary over shift time T for an invalid engagement time of 40 msec.
Figure 32:
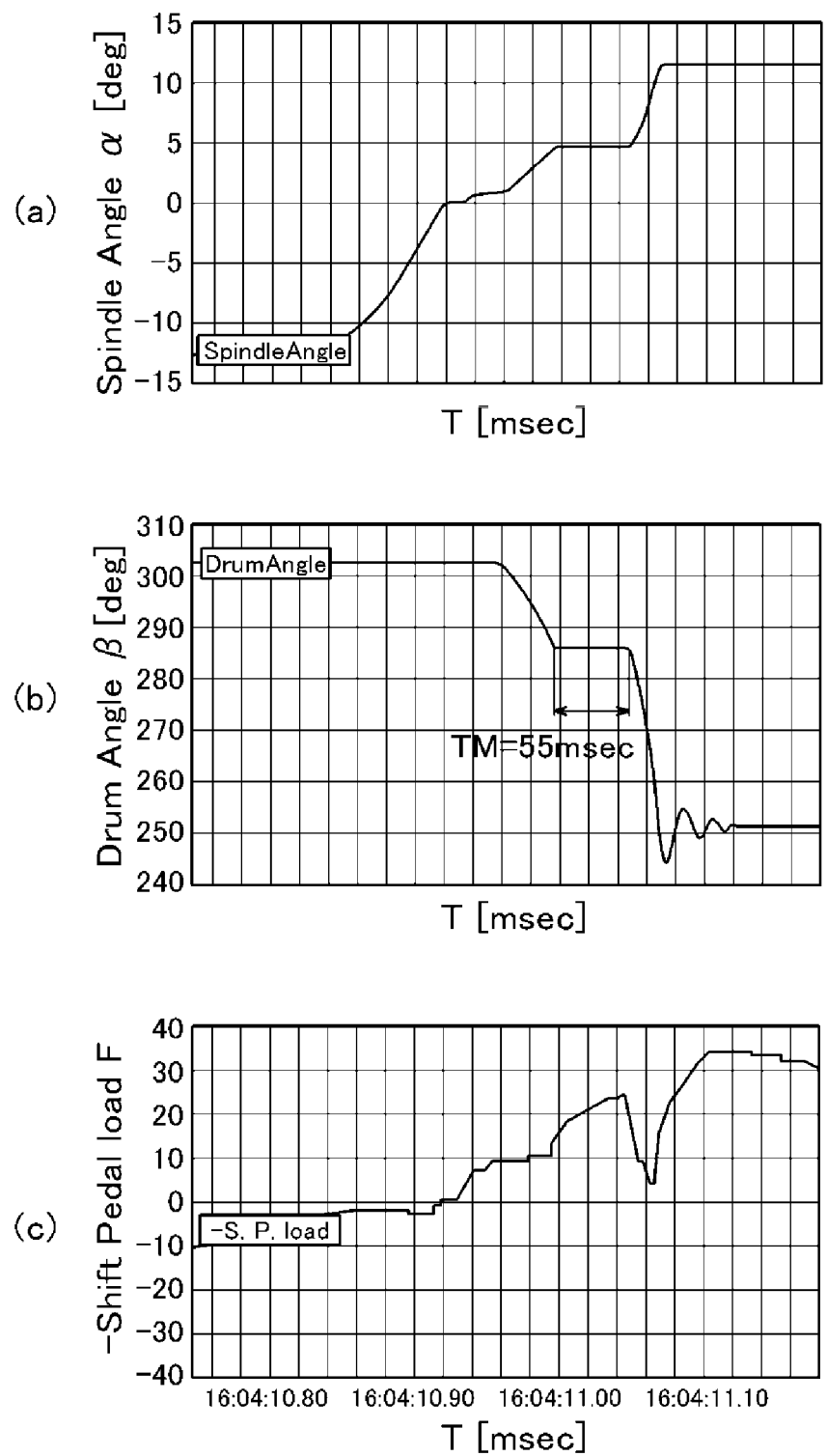
FIG. 32 are views depicting how shift spindle angle α, drum angle β, and shift pedal load F vary over shift time T for an invalid engagement time of 55 msec.
Figure 33:
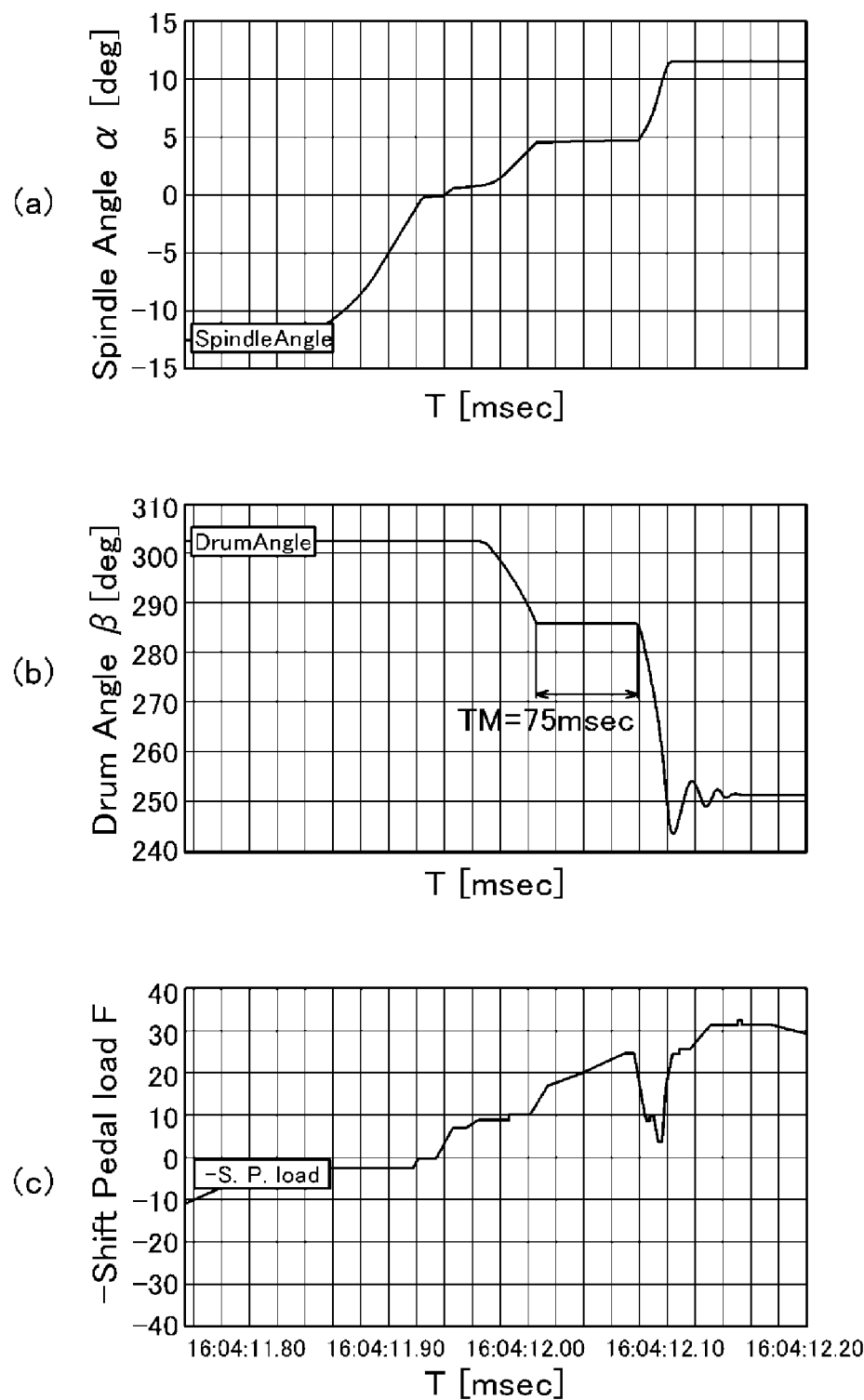
FIG. 33 are views depicting how shift spindle angle α, drum angle β, and shift pedal load F vary over shift time T for an invalid engagement time of 75 msec.
Figure 34:
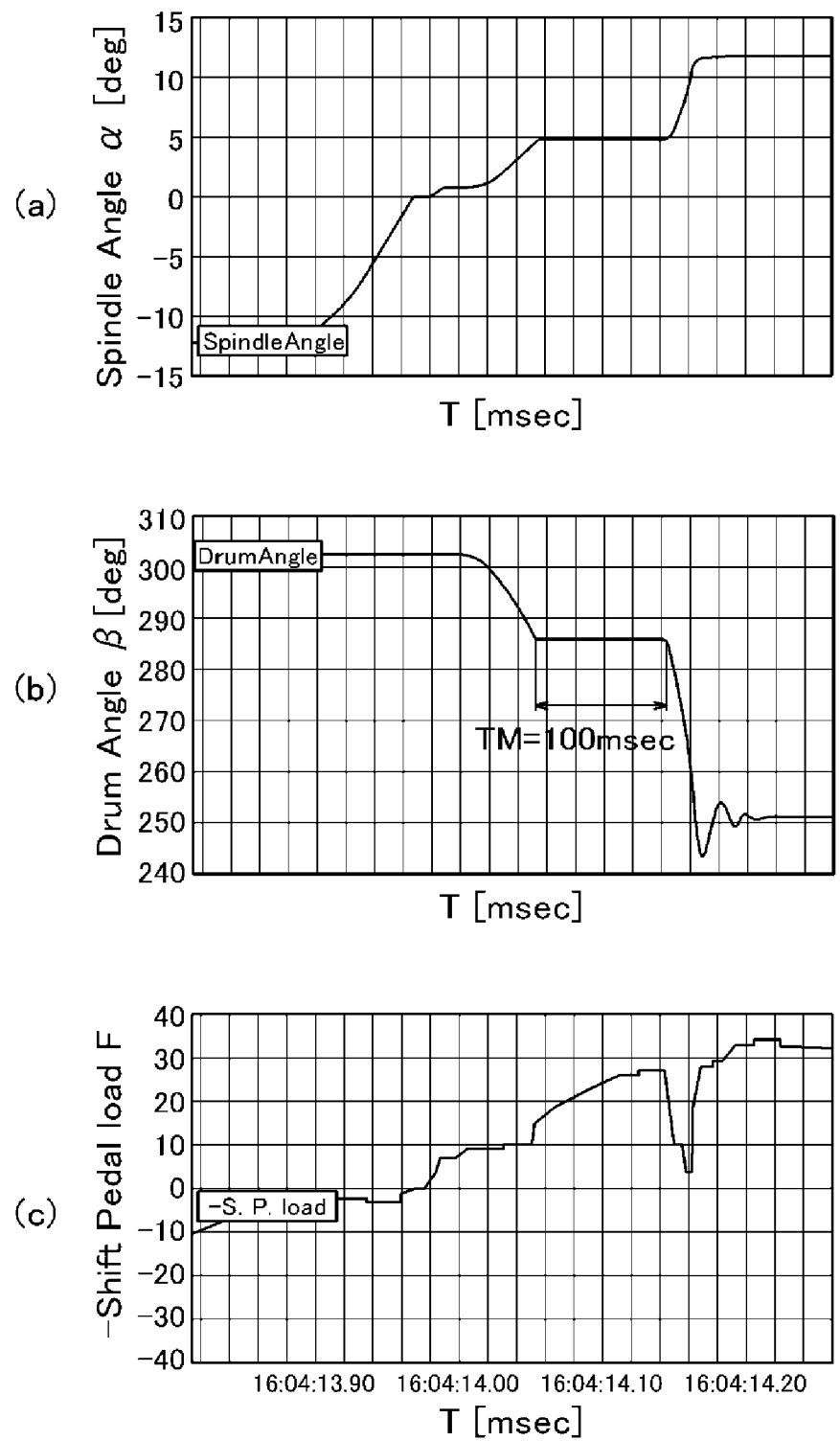
FIG. 34 are views depicting how shift spindle angle α, drum angle β, and shift pedal load F vary over shift time T for an invalid engagement time of 100 msec.
Figure 35:
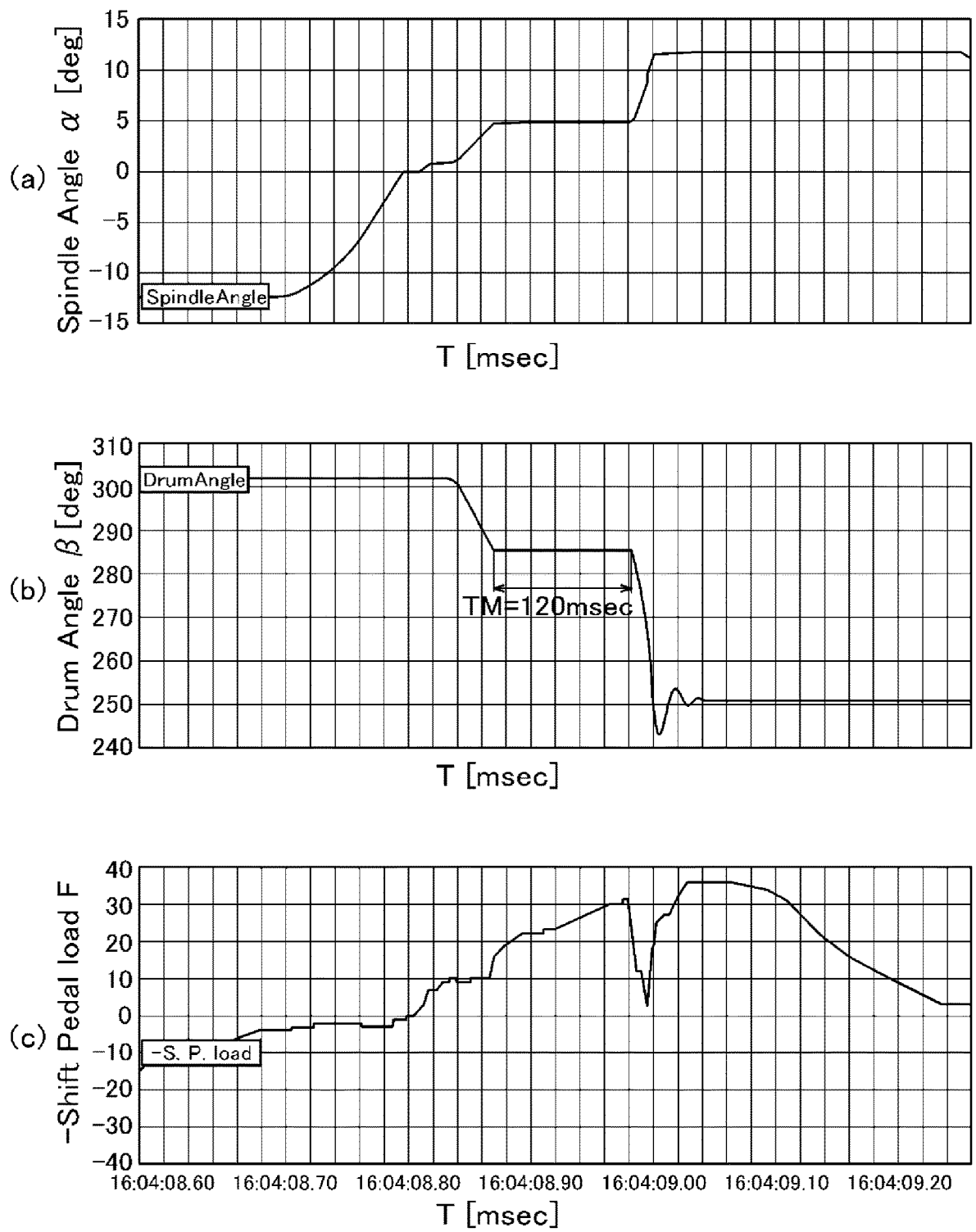
FIG. 35 are views depicting how shift spindle angle α, drum angle β, and shift pedal load F vary over shift time T for an invalid engagement time of 120 msec.

As depicted in FIGS. 28 and 29, according to the experimental results which indicate invalid engagement times TM of 15 msec. and 30 msec., there is a time during which shift pedal load F increases while the facing wall surfaces of the dowels and the facing wall surfaces of dowel columns abut against each other, though the time is short. Therefore, the gearshift operator does not likely to feel a gear shifting operation as if performed with a two-stage motion, but feels the gear shifting operation as good. It can be seen that the range from 0 msec. to 30 msec. is a good range for invalid engagement time TM.

As depicted in FIGS. 30(a), 30(b), and 30(c), according to the experimental results which indicate an invalid engagement time TM of 35 msec., the time during which shift pedal load F increases while the facing wall surfaces of the dowels and the facing wall surfaces of dowel columns abut against each other is longer, but is not very long. The gearshift operator is less liable to feel a gear shifting operation as if performed with a two-stage motion, but feels the gear shifting operation as preferable.

As depicted in FIGS. 31 through 35, according to the experimental results which indicate invalid engagement times TM of 40 msec. and longer, the time during which shift pedal load F increases while the facing wall surfaces of the dowels and the facing wall surfaces of dowel columns abut against each other is so long as to make the gearshift operator feel a gear shifting operation as if performed with a two-stage motion, and feel the gear shifting operation as poor. In the invalid engagement times TM of 40 msec. and longer, therefore, the gearshift operator feels gear shifting operations as not good. Consequently, the range from 0 msec. to a time length below 40 msec. is considered to be a preferable range for invalid engagement time TM.

The relationship between the duration of invalid engagement time TM and gear shifting feels of the gearshift operator is related to a time lag in the response of the metal components of the transmission gear shifting mechanism to gear shifting operations and shift pedal load F, the speed at which the gearshift operator depresses the shift pedal, and a feel of the gearshift operator that the time during which shift pedal load F increases is long and gear shift operations are not smooth, and does not depend on the rotational speed of the internal combustion engine E.

The shorter the duration of invalid engagement time TM is, the less likely gear shifting operations are performed with a two-stage motion and the more smooth gear shifting operations are felt by the gearshift operator. It is effective to reduce dowel nipping angle θ1 and dowel column nipping angle θ2 in order to shorten the duration of invalid engagement time TM. However, reducing dowel nipping angle θ1 and dowel column nipping angle θ2 results in a reduction in the widths of the dowels and the dowel columns, posing a problem on the mechanical strength of the dowels and the dowel columns. To solve this problem, the number of the dowels is increased to reduce the load applied per dowel, and the annular stiffener and the back plate are provided that join the dowels to increase the mechanical strength of the dowels. Furthermore, the annular stiffener and the back plate are also provided that join the dowel columns to increase the mechanical strength of the dowel columns.

◆Experiments to Measure Invalid Engagement Time in Gear Shifting Operations Under Gear Conditions◆

Five types of transmission apparatus including the transmission apparatus according to Inventive Example 1 as the present embodiment were prepared, and four types of transmission apparatus according to Comparative Examples were prepared. On each of the transmission apparatus, invalid engagement times TM were measured under conditions given below in gear shifting-up operations and gear shifting-down operations for the gear positions, and conditions for the transmission apparatus to keep invalid engagement time TM in a good range were determined.

The conditions for the gear positions with respect to Inventive Examples 1 through 5 and Comparative Examples 1 through 4 include the number of dowels N, dowel nipping angle θ1, dowel column nipping angle θ2, backlash angle θ3, whether there is an inner circumferential stiffener ring or not, whether there is an outer circumferential stiffener ring or not, whether the relationship a<b is satisfied or not for the dowels, whether the relationship c<d is satisfied or not for the dowel columns, dowel spreading angle θ4, and dowel column spreading angle θ5, as depicted in Tables 2 through 4 below.

With respect to each of the transmission apparatus according to Inventive Examples 1 through 5 and Comparative Examples 1 through 4, invalid engagement times TM were measured at a prescribed engine rotational speed Ne of the internal combustion engine E which corresponds to an idling engine rotational speed of 1200 rpm, and the results are depicted in Table 5. Since invalid engagement time TM becomes shorter as the engine rotational speed of the internal combustion engine E is higher, the longest invalid engagement time for the internal combustion engine E can be inspected by measuring invalid engagement time TM at the idling engine rotational speed which is the lowest rotational speed of the engine E. According to the present experiment, therefore, invalid engagement times TM were measured at the engine rotational speed of 1200 rpm which is the idling engine rotational speed.

TABLE 2

| | | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|---|
| 1st gear position | Number of dowels N | 12 | 11 | 9 | 13 | 14 | 7 | 5 | 6 | 5 |
| | Dowel nipping angle θ1 | 7 | 8 | 13 | 7 | 8 | 21 | 27 | 24 | 29 |
| | Dowel column nipping angle θ2 | 7 | 8 | 7 | 7 | 8 | 15 | 23 | 13 | 14 |
| | Backlash angle θ3 | 15 | 16 | 20 | 13 | 9 | 16 | 22 | 23 | 29 |
| | Inner circumferential stiffener ring | ○ | ○ | ○ | ○ | ○ | ○ | x | x | x |
| | Outer circumferential stiffener ring | ○ | ○ | ○ | ○ | ○ | ○ | ○ | ○ | ○ |
| | a < b | ○ | ○ | ○ | ○ | ○ | ○ | — | — | — |
| | c < d | ○ | ○ | ○ | ○ | ○ | ○ | — | — | — |
| | Dowel spreading angle θ4 | 25 | 19 | 10 | 25 | 15 | 15 | 0 | 0 | 0 |
| | Dowel column spreading angle θ5 | 25 | 19 | 10 | 25 | 15 | 15 | 0 | 0 | 0 |
| 2nd gear position | Number of dowels N | 12 | 11 | 11 | 12 | 14 | 8 | 5 | 6 | 4 |
| | Dowel nipping angle θ1 | 8 | 8 | 8 | 8 | 8 | 15 | 30 | 24 | 29 |
| | Dowel column nipping angle θ2 | 8 | 8 | 6 | 8 | 8 | 14 | 18 | 10 | 18 |
| | Backlash angle θ3 | 15 | 16 | 19 | 15 | 9 | 17 | 24 | 26 | 43 |
| | Inner circumferential stiffener ring | ○ | ○ | ○ | ○ | ○ | ○ | x | x | x |

TABLE 2-continued

|  | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|
| Outer circumferential stiffener ring | ○ | ○ | ○ | ○ | ○ | ○ | ○ | ○ | ○ |
| a < b | ○ | ○ | ○ | ○ | ○ | ○ | — | — | — |
| c < d | ○ | ○ | ○ | ○ | ○ | ○ | — | — | — |
| Dowel spreading angle $\theta 4$ | 35 | 15 | 10 | 35 | 15 | 15 | 0 | 0 | 0 |
| Dowel column spreading angle $\theta 5$ | 35 | 15 | 10 | 35 | 15 | 15 | 0 | 0 | 0 |

TABLE 3

|  |  | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|---|
| 3rd gear position | Number of dowels N | 12 | 12 | 11 | 13 | 15 | 8 | 6 | 6 | 4 |
|  | Dowel nipping angle $\theta 1$ | 8 | 8 | 7 | 8 | 8 | 15 | 28 | 29 | 30 |
|  | Dowel column nipping angle $\theta 2$ | 8 | 8 | 7 | 8 | 8 | 13 | 11 | 10 | 20 |
|  | Backlash angle $\theta 3$ | 15 | 15 | 19 | 13 | 9 | 17 | 21 | 21 | 40 |
|  | Inner circumferential stiffener ring | ○ | ○ | ○ | ○ | ○ | ○ | x | x | x |
|  | Outer circumferential stiffener ring | ○ | ○ | ○ | ○ | ○ | ○ | ○ | ○ | ○ |
|  | a < b | ○ | ○ | ○ | ○ | ○ | ○ | — | — | — |
|  | c < d | ○ | ○ | ○ | ○ | ○ | ○ | — | — | — |
|  | Dowel spreading angle $\theta 4$ | 15 | 15 | 10 | 15 | 15 | 15 | 0 | 0 | 0 |
|  | Dowel column spreading angle $\theta 5$ | 15 | 15 | 10 | 15 | 15 | 15 | 0 | 0 | 0 |
| 4th gear position | Number of dowels N | 12 | 12 | 11 | 15 | 15 | 7 | 6 | 6 | 4 |
|  | Dowel nipping angle $\theta 1$ | 8 | 8 | 9 | 8 | 8 | 21 | 29 | 29 | 30 |
|  | Dowel column nipping angle $\theta 2$ | 8 | 8 | 9 | 8 | 8 | 11 | 11 | 10 | 20 |
|  | Backlash angle $\theta 3$ | 15 | 15 | 16 | 9 | 9 | 19 | 20 | 21 | 40 |
|  | Inner circumferential stiffener ring | ○ | ○ | ○ | ○ | ○ | x | x | x | x |
|  | Outer circumferential stiffener ring | ○ | ○ | ○ | ○ | ○ | ○ | ○ | ○ | ○ |
|  | a < b | ○ | ○ | ○ | ○ | ○ | — | — | — | — |
|  | c < d | ○ | ○ | ○ | ○ | ○ | — | — | — | — |
|  | Dowel spreading angle $\theta 4$ | 15 | 15 | 15 | 15 | 15 | 0 | 0 | 0 | 0 |
|  | Dowel column spreading angle $\theta 5$ | 15 | 15 | 15 | 15 | 15 | 0 | 0 | 0 | 0 |

TABLE 4

|  |  | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|---|
| 5th gear position | Number of dowels N | 12 | 11 | 9 | 15 | 13 | 7 | 6 | 6 | 4 |
|  | Dowel nipping angle $\theta 1$ | 8 | 8 | 10 | 8 | 8 | 22 | 22 | 20 | 29 |
|  | Dowel column nipping angle $\theta 2$ | 8 | 8 | 12 | 8 | 8 | 10 | 15 | 20 | 27 |
|  | Backlash angle $\theta 3$ | 15 | 16 | 18 | 9 | 11 | 19 | 20 | 20 | 34 |
|  | Inner circumferential stiffener ring | ○ | ○ | ○ | ○ | ○ | x | ○ | x | x |
|  | Outer circumferential stiffener ring | ○ | ○ | ○ | ○ | ○ | ○ | x | ○ | ○ |
|  | a < b | ○ | ○ | ○ | ○ | ○ | — | ○ | — | — |
|  | c < d | ○ | ○ | ○ | ○ | ○ | — | ○ | — | — |
|  | Dowel spreading angle $\theta 4$ | 20 | 10 | 17 | 20 | 13 | 0 | 0 | 0 | 0 |

TABLE 4-continued

|  |  | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|---|
|  | Dowel column spreading angle θ5 | 20 | 10 | 17 | 20 | 13 | 0 | 0 | 0 | 0 |
| 6th gear position | Number of dowels N | 12 | 11 | 8 | 19 | 14 | 7 | 6 | 6 | 5 |
|  | Dowel nipping angle θ1 | 8 | 8 | 20 | 8 | 8 | 22 | 19 | 20 | 22 |
|  | Dowel column nipping angle θ2 | 8 | 8 | 8 | 8 | 8 | 10 | 17 | 20 | 22 |
|  | Backlash angle θ3 | 15 | 17 | 16 | 4 | 10 | 20 | 24 | 20 | 28 |
|  | Inner circumferential stiffener ring | ○ | ○ | x | ○ | ○ | x | ○ | x | x |
|  | Outer circumferential stiffener ring | ○ | ○ | ○ | ○ | ○ | ○ | x | ○ | ○ |
|  | a < b | ○ | ○ | ○ | ○ | ○ | — | ○ | — | — |
|  | c < d | ○ | ○ | ○ | ○ | ○ | — | ○ | — | — |
|  | Dowel spreading angle θ4 | 15 | 5 | 15 | 15 | 5 | 0 | 0 | 0 | 0 |
|  | Dowel column spreading angle θ5 | 15 | 5 | 15 | 15 | 5 | 0 | 0 | 0 | 0 |

TABLE 5

INVALID ENGAGEMENT TIME TM

|  | In. Ex. 1 | In. Ex. 2 | In. Ex. 3 | In. Ex. 4 | In. Ex. 5 | Co. Ex. 1 | Co. Ex. 2 | Co. Ex. 3 | Co. Ex. 4 |
|---|---|---|---|---|---|---|---|---|---|
| Low → 2nd | 26.7 | 27.1 | 25.1 | 26.7 | 27.1 | 50.7 | 79.3 | 62.5 | 99.7 |
| 2nd → 3rd | 24.6 | 28.2 | 27.1 | 24.6 | 28.2 | 46 | 75.2 | 73.5 | 137.4 |
| 3rd → 4th | 27.4 | 29.3 | 38.1 | 27.4 | 29.3 | 58.5 | 76.2 | 86.9 | 131.8 |
| 4th → 5th | 28.8 | 40 | 45.5 | 28.8 | 40.8 | 61.5 | 107.5 | 83.1 | 156.1 |
| 5th → 6th | 24.5 | 49.8 | 76 | 24.5 | 49.8 | 51.4 | 121.7 | 106.4 | 172.7 |
| 2nd → Low | 26.7 | 27.1 | 36.6 | 26.7 | 27.7 | 63.3 | 94.1 | 68 | 91.4 |
| 3rd → 2nd | 24.6 | 30.8 | 27.8 | 24.6 | 30.8 | 46.8 | 90.2 | 64.1 | 134.6 |
| 4th → 3rd | 27.4 | 29.3 | 32 | 27.4 | 29.3 | 51.2 | 78.2 | 86.9 | 161.5 |
| 5th → 4th | 29.8 | 42.1 | 43.2 | 29.8 | 42.1 | 63.5 | 109.6 | 98.6 | 140.6 |
| 6th → 5th | 20.5 | 45.2 | 53.4 | 20.5 | 46.1 | 43.8 | 121.5 | 97.5 | 203.4 |

The experimental results of Inventive Examples of the transmission apparatus for a saddle-type vehicle according to the present invention will be described in comparison with the experiment results of Comparative Examples. Note that the transmission apparatus for a saddle-type vehicle according to Inventive Examples 1 through 5 and Comparative Examples 1 through 4 are applied as manual transmission apparatus for a motorcycle.

In Table 5, invalid engagement times TM of each of the various transmission apparatus were evaluated. They were evaluated while paying attention to gear shifting operations between gear positions ranging from first through fourth gear positions which are frequently used by the motorcycle when driven in town.

In Inventive Examples 1 through 5, invalid engagement time TM in gear shifting-up operations from the first to second gear positions, from the second to third gear positions, and from the third to fourth gear positions had a minimum value of 24.6 msec. and a maximum value of 38.1 msec. It has been found that invalid engagement time TM in these gear shifting-up operations is in a range smaller than the range from 0 msec. to 40 msec. where the gearshift operator feels the gear shifting operations as good.

In Comparative Examples 1 through 4, invalid engagement time TM in gear shifting-up operations from the first to second gear positions, from the second to third gear positions, and from the third to fourth gear positions had a minimum value of 46.0 msec. and a maximum value of 131.8 msec. It has been found that invalid engagement time TM in these gear shifting-up operations is not in a range smaller than the range from 0 msec. to 40 msec. where the gearshift operator feels the gear shifting operations as good, but that the gearshift operator feels the gear shifting operations in Comparative Examples 1 through 4 as if performed with a two-stage motion, and does not feel the gear shifting operations as a smooth process.

In Inventive Examples 1 through 5, invalid engagement time TM in gear shifting-down operations from the second to first gear positions, from the third to second gear positions, and from the fourth to third gear positions had a minimum value of 24.6 msec. and a maximum value of 36.6 msec. It has been found that invalid engagement time TM in these gear shifting-down operations is in a range smaller than the range from 0 msec. to 40 msec. where the gearshift operator feels the gear shifting operations as good.

In Comparative Examples 1 through 4, invalid engagement time TM in gear shifting-down operations from the second to first gear positions, from the third to second gear positions, and from the fourth to third gear positions had a minimum value of 46.8 msec. and a maximum value of 161.5 msec. It has been found that invalid engagement time TM in these gear shifting-down operations is not in a range smaller than the range from 0 msec. to 40 msec. where the gearshift operator feels the gear shifting operations as good, but that the gearshift operator feels the gear shifting operations in Comparative Examples 1 through 4 as if performed with a two-stage motion, and does not feel the gear shifting operations as a smooth process.

The relationship between the various conditions and invalid engagement time TM for these gear positions will be reviewed below. In Inventive Examples 1 through 5, the dowel nipping angles θ1 for the gear positions are generally in the range of 6 degrees<θ1<9 degrees. In Comparative Examples 1 through 4, the dowel nipping angles θ1 are in the range of 10 degrees<θ1<30 degrees. It has been found that dowel nipping angle θ1 is good in the range from 6 degrees to a value below 9 degrees.

In Inventive Examples 1 through 5, the dowel column nipping angles θ2 for the gear positions are generally in the range of 6 degrees<θ2<9 degrees. In Comparative Examples 1 through 4, the dowel column nipping angles θ2 are in the range of 10 degrees<θ2<23 degrees. It has been found that dowel column nipping angle θ2 is good in the range from 6 degrees to a value below 9 degrees.

In Inventive Examples 1 through 5, the numbers of dowels N for the gear positions are in the range of 8<N<19 and generally in the range of 11<N<19. In Comparative Examples 1 through 4, the numbers of dowels N are in the range of 5<N<8. It has been found that the range of 11<N<19 is a preferable range for the number of dowels N, and the range of 11<N<15 is an optimum range for the number of dowels N.

The transmission apparatus according to the above embodiment of the present invention is arranged as described above and offers the following advantages.

In the transmission apparatus for a saddle-type vehicle according to the above embodiment of the present invention, since invalid engagement time TM during which the dowels 61, 62, 63, 64, 65, and 66 and the dowel columns 91, 92, 93, 94, 95, and 96 abut and slide against each other at an idling engine rotational speed is in the range from 0 msec. to a value below 40 msec., invalid engagement time TM during which the facing wall surfaces 61a, 62a, 63a, 64a, 65a, and 66a of the dowels 61, 62, 63, 64, 65, and 66 and the facing wall surfaces 91a, 92a, 93a, 94a, 95a, and 96a of the dowel columns 91, 92, 93, 94, 95, and 96 abut and slide against each other is reduced thereby to reduce hammering noise of the dowels, making gear shifting operations smooth to provide an improved feeling therefor. Both the dowels 61, 62, 63, 64, 65, and 66 and the dowel columns 91, 92, 93, 94, 95, and 96 are of a minimum size for dealing with torques that can be transmitted by the transmission apparatus, and the numbers of the dowels 61, 62, 63, 64, 65, and 66 and the dowel columns 91, 92, 93, 94, 95, and 96 are increased to achieve the required mechanical strength of the dowels and the dowel columns. The dowel backlash angle is reduced to reduce hammering noise produced when the dowels mesh with the dowel columns and also to reduce wobbling and backlash caused when the dowels mesh with the dowel columns.

The number of the dowels 61, 62, 63, 64, 65, and 66 is in the range from 11 to 19, and the number of the dowel columns 91, 92, 93, 94, 95, and 96 is in the range from 11 to 19. Therefore, the number of dowels and the number of dowel columns are thus optimized to achieve the required mechanical strength of the dowels and the dowel columns. The dowel backlash angle is reduced to reduce hammering noise produced when the dowels mesh with the dowel columns and also to reduce wobbling and backlash caused when the dowels mesh with the dowel columns.

Dowel nipping angle θ1 is in the range from 6 degrees to 9 degrees, and dowel column nipping angle θ2 is in the range from 6 degrees to 9 degrees. Dowel nipping angle θ1 and dowel column nipping angle θ2 are thus small angles, allowing the numbers of dowels and the number of dowel columns to increase, so that invalid engagement time TM can be shortened for making gear shifting operations smooth.

Backlash angle θ3 between the dowels 61, 62, 63, 64, 65, and 66 and the dowel columns 91, 92, 93, 94, 95, and 96 is in the range from 0 degree to 15 degrees. As backlash angle θ3 between the dowels 61, 62, 63, 64, 65, and 66 and the dowel columns 91, 92, 93, 94, 95, and 96 is a small angle, it is possible to increase the number of dowels and reduce invalid engagement time TM for an enhanced feeling for gear shifting operations.

The dowels 61, 62, 63, 64, 65, and 66 include the inner circumferential stiffener rings 71, 72, 73, 74, 75, and 76 and the dowel back plates 81, 82, 83, 84, 85, and 86, and the dowel columns 91, 92, 93, 94, 95, and 96 include the outer circumferential stiffener rings 111, 112, 113, 114, 115, and 116 and the dowel column back plates 121, 122, 123, 124, 125, and 126. Therefore, the mechanical strength of the dowels 61, 62, 63, 64, 65, and 66 and the dowel columns 91, 92, 93, 94, 95, and 96 is increased.

The abutment surfaces 61d, 62d, 63d, 64d, 65d, and 66d of the dowels 61, 62, 63, 64, 65, and 66 for abutment against the dowel columns 91, 92, 93, 94, 95, and 96 are spread or angularly spaced from the line segments extending from the center C of rotation of the transmission gears through the abutment points P between the dowels 61, 62, 63, 64, 65, and 66 and the dowel columns 91, 92, 93, 94, 95, and 96 by dowel spreading angle θ4, and the abutment surfaces 91d, 92d, 93d, 94d, 95d, and 96d of the dowel columns 91, 92, 93, 94, 95, and 96 for abutment against the dowels 61, 62, 63, 64, 65, and 66 are spread or angularly spaced from the line segments extending from the center C of rotation of the transmission gears through the abutment points P between the dowels 61, 62, 63, 64, 65, and 66 and the dowel columns 91, 92, 93, 94, 95, and 96 by dowel column spreading angle θ5. Consequently, the mechanical strength of the dowel base ends 61c, 62c, 63c, 64c, 65c, and 66c of the dowels 61, 62, 63, 64, 65, and 66 and the dowel column base ends 91c, 92c, 93c, 94c, 95c, and 96c of the dowel columns 91, 92, 93, 94, 95, and 96 is increased for an increase in the mechanical strength of the dowels and the mechanical strength of the dowel columns.

The length "a" from the pitch circle PC of the dowels 61, 62, 63, 64, 65, and 66 and the dowel columns 91, 92, 93, 94, 95, and 96 to the dowel tip ends 61b, 62b, 63b, 64b, 65b, and 66b of the dowels 61, 62, 63, 64, 65, and 66 is smaller than the length "b" from the pitch circle PC of the dowels 61, 62, 63, 64, 65, and 66 and the dowel columns 91, 92, 93, 94, 95, and 96 to the dowel base ends 61c, 62c, 63c, 64c, 65c, and 66c of the dowels 61, 62, 63, 64, 65, and 66, and the length "c" from the pitch circle PC of the dowels 61, 62, 63, 64, 65, and 66 and the dowel columns 91, 92, 93, 94, 95, and 96 to the dowel column tip ends 91b, 92b, 93b, 94b, 95b, and 96b of the dowel columns 91, 92, 93, 94, 95, and 96 is smaller than the length "d" from the pitch circle PC of the dowels 61, 62, 63, 64, 65, and 66 and the dowel columns 91, 92, 93, 94, 95, and 96 to the dowel column base ends 91c, 92c, 93c, 94c, 95c, and 96c of the dowel columns 91, 92, 93, 94, 95, and 96. Consequently, the mechanical strength of the dowel base ends 61c, 62c, 63c, 64c, 65c, and 66c and the dowel column base ends 91c, 92c, 93c, 94c, 95c, and 96c is further increased to further increase the mechanical strength of the dowels 61, 62, 63, 64, 65, and 66 and the dowel columns 91, 92, 93, 94, 95, and 96 in their entirety.

Of the abutment surfaces of the dowels 61, 62, 63, 64, 65, and 66 and the dowel columns 91, 92, 93, 94, 95, and 96 which abut against each other, the abutment surfaces 91d, 92d, 93d, 94d, 95d, and 96d of the dowel columns 91, 92, 93, 94, 95, and 96 are straight whereas the abutment surfaces 61d, 62d, 63d, 64d, 65d, and 66d of the dowels 61, 62, 63, 64, 65, and 66 are curved as viewed along the axis of rotation of the transmission gears. Therefore, variations of the radii of the abutment points between the dowels and the dowel columns from the center of rotation of the transmission gears are reduced, tending to uniformize stresses in the dowels 61, 62, 63, 64, 65, and 66 and the dowel columns 91, 92, 93, 94, 95, and 96.

The inflection points IP91b, IP92b, IP93b, IP94b, IP95b, and IP96b on the dowel columns 91, 92, 93, 94, 95, and 96 between the curved surfaces of the dowel column base ends 91c, 92c, 93c, 94c, 95c, and 96c of the dowel columns 91, 92, 93, 94, 95, and 96 and the abutment surfaces 91d, 92d, 93d, 94d, 95d, and 96d thereof are positioned radially outwardly of the inflection points IP61a, IP62a, IP63a, IP64a, IP65a, and IP66a on the dowels 61, 62, 63, 64, 65, and 66 between the curved surfaces of the dowel tip ends 61b, 62b, 63b, 64b, 65b, and 66b of the dowels 61, 62, 63, 64, 65, and 66 and the abutment surfaces 61d, 62d, 63d, 64d, 65d, and 66d thereof, and the inflection points IP61b, IP62b, IP63b, IP64b, IP65b, and IP66b on the dowels 61, 62, 63, 64, 65, and 66 between the curved surfaces of the dowel base ends 61c, 62c, 63c, 64c, 65c, and 66c of the dowels 61, 62, 63, 64, 65, and 66 and the abutment surfaces 61d, 62d, 63d, 64d, 65d, and 66d thereof are positioned radially inwardly of the inflection points IP91a, IP92a, IP93a, IP94a, IP95a, and IP96a on the dowel columns 91, 92, 93, 94, 95, and 96 between the curved surfaces of the dowel column tip ends 91b, 92b, 93b, 94b, 95b, and 96b of the dowel columns 91, 92, 93, 94, 95, and 96 and the abutment surfaces 91d, 92d, 93d, 94d, 95d, and 96d thereof. Therefore, the dowels 61, 62, 63, 64, 65, and 66 and the dowel columns 91, 92, 93, 94, 95, and 96 can be brought closer to each other, making it possible to increase the numbers of the dowels 61, 62, 63, 64, 65, and 66 and the dowel columns 91, 92, 93, 94, 95, and 96 can further be increased.

Although the embodiment of the present invention has been described in detail, the present invention is not limited to the embodiment described above, but many changes and modifications may be made therein. The transmission apparatus for a saddle-type vehicle according to the present invention is not limited to being used on a motorcycle, but is widely applicable to other kinds of saddle-type vehicles.

The invention claimed is:

1. A transmission apparatus for a saddle-type vehicle, comprising:
   first transmission gears supported on support shafts so as to be circumferentially non-rotatable and axially slidable with respect to said support shafts; and
   second transmission gears supported on said support shafts adjacent to said first transmission gears so as to be circumferentially rotatable and axially non-slidable with respect to said support shafts;
   said first transmission gears having dowels projecting axially;
   said second transmission gears having dowel holes defined axially concavely therein and dowel columns defining said dowel holes;
   said dowels being engageable in and disengageable from said dowel holes to shift gear positions;
   said first transmission gears being slidable in response to angular movement of a shift spindle caused by operating a shift pedal;
   wherein a length from a pitch circle of said dowels and said dowel columns to dowel tip ends of said dowels is smaller than a length from the pitch circle of said dowels and said dowel columns to dowel base ends of said dowels; and
   a length from the pitch circle of said dowels and said dowel columns to dowel column tip ends of said dowel columns is smaller than a length from the pitch circle of said dowels and said dowel columns to dowel column base ends of said dowel columns.

2. The transmission apparatus for a saddle-type vehicle according to claim 1, wherein an invalid engagement time during which facing wall surfaces of said dowels and facing wall surfaces of said dowel columns abut and slide against each other at an idling engine rotational speed is in the range from 0 millisecond to a value below 40 millisecond.

3. The transmission apparatus for a saddle-type vehicle according to claim 1, wherein an invalid engagement time during which facing wall surfaces of said dowels and facing wall surfaces of said dowel columns abut and slide against each other at an idling engine rotational speed is in the range from 0 millisecond to a value below 40 millisecond.

4. The transmission apparatus for a saddle-type vehicle according to claim 1, wherein a dowel nipping angle between line segments extending from the center of rotation of the transmission gears through abutment points on both sides of said dowels where said dowels and said dowel columns abut against each other is in the range from 6 degrees to 9 degrees; and
   a dowel column nipping angle between line segments extending from the center of rotation of the transmission gears through abutment points on both sides of said dowel columns where said dowel columns and said dowels abut against each other is in the range from 6 degrees to 9 degrees.

5. The transmission apparatus for a saddle-type vehicle according to claim 1, wherein a backlash angle between said dowels and said dowel columns is in the range from 0 degree to 15 degrees.

6. The transmission apparatus for a saddle-type vehicle according to claim 1, wherein said dowels include inner circumferential stiffener rings and dowel back plates; and
   said dowel columns include outer circumferential stiffener rings and dowel column back plates.

7. The transmission apparatus for a saddle-type vehicle according to claim 1, wherein said dowels have abutment surfaces for abutment against said dowel columns, the abutment surfaces being spread from line segments extending from the center of rotation of the transmission gears through abutment points between said dowels and said dowel columns by a dowel spreading angle; and
   said dowel columns have abutment surfaces for abutment against said dowels, the abutment surfaces being spread from line segments extending from the center of rotation of the transmission gears through abutment points between said dowels and said dowel columns by a dowel column spreading angle.

8. A transmission apparatus for a saddle-type vehicle, comprising:
   first transmission gears supported on support shafts so as to be circumferentially non-rotatable and axially slidable with respect to said support shafts; and
   second transmission gears supported on said support shafts adjacent to said first transmission gears so as to be circumferentially rotatable and axially non-slidable with respect to said support shafts;
   said first transmission gears having dowels projecting axially;

said second transmission gears having dowel holes defined axially concavely therein and dowel columns defining said dowel holes;
said dowels being engageable in and disengageable from said dowel holes to shift gear positions;
said first transmission gears being slidable in response to angular movement of a shift spindle caused by operating a shift pedal;
wherein said dowels have abutment surfaces for abutment against said dowel columns, the abutment surfaces being spread from line segments extending from the center of rotation of the transmission gears through abutment points between said dowels and said dowel columns by a dowel spreading angle;
said dowel columns have abutment surfaces for abutment against said dowels, the abutment surfaces being spread from line segments extending from the center of rotation of the transmission gears through abutment points between said dowels and said dowel columns by a dowel column spreading angle; and
wherein of the abutment surfaces of said dowels and said dowel columns which abut against each other, the abutment surfaces of either said dowels or said dowel columns are straight whereas the surfaces of the other are curved as viewed along the axis of rotation of the transmission gears.

9. A transmission apparatus for a saddle-type vehicle, comprising:
first transmission gears supported on support shafts so as to be circumferentially non-rotatable and axially slidable with respect to said support shafts; and
second transmission gears supported on said support shafts adjacent to said first transmission gears so as to be circumferentially rotatable and axially non-slidable with respect to said support shafts;
said first transmission gears having dowels projecting axially;
said second transmission gears having dowel holes defined axially concavely therein and dowel columns defining said dowel holes;
said dowels being engageable in and disengageable from said dowel holes to shift gear positions;
said first transmission gears being slidable in response to angular movement of a shift spindle caused by operating a shift pedal;
wherein said dowels have abutment surfaces for abutment against said dowel columns, the abutment surfaces being spread from line segments extending from the center of rotation of the transmission gears through abutment points between said dowels and said dowel columns by a dowel spreading angle; and
said dowel columns have abutment surfaces for abutment against said dowels, the abutment surfaces being spread from line segments extending from the center of rotation of the transmission gears through abutment points between said dowels and said dowel columns by a dowel column spreading angle;
wherein inflection points on said dowel columns between curved surfaces of dowel column base ends of said dowel columns and the abutment surfaces thereof are positioned radially outwardly of inflection points on said dowels between curved surfaces of dowel tip ends of said dowels and the abutment surfaces thereof; and
the inflection points on said dowels between curved surfaces of dowel base ends of said dowels and the abutment surfaces thereof are positioned radially inwardly of inflection points on said dowel columns between curved surfaces of dowel column tip ends of said dowel columns and abutment surfaces thereof.

* * * * *